United States Patent
Halke et al.

(10) Patent No.: US 7,640,561 B1
(45) Date of Patent: Dec. 29, 2009

(54) METHOD AND SYSTEM OF MEDIA PROGRAMMING TO PROVIDE AN INTEGRATED ENTERTAINMENT EXPERIENCE

(75) Inventors: Richard P. Halke, Los Angeles, CA (US); Philip R. Needles, Los Angeles, CA (US)

(73) Assignee: IntEnt Media Ventures, Los Angeles, CA (US)

( * ) Notice: Subject to any disclaimer, the term of this patent is extended or adjusted under 35 U.S.C. 154(b) by 1267 days.

(21) Appl. No.: 10/278,849

(22) Filed: Oct. 24, 2002

Related U.S. Application Data

(60) Provisional application No. 60/330,545, filed on Oct. 24, 2001.

(51) Int. Cl.
H04H 20/14 (2008.01)
H04N 7/025 (2006.01)

(52) U.S. Cl. .......................................... 725/34; 725/22

(58) Field of Classification Search ................. 725/10, 725/14, 22, 23, 24, 35, 39, 46, 34, 135, 37
See application file for complete search history.

(56) References Cited

U.S. PATENT DOCUMENTS

| | | | | |
|---|---|---|---|---|
| 6,522,342 | B1* | 2/2003 | Gagnon et al. | 715/716 |
| 6,898,762 | B2* | 5/2005 | Ellis et al. | 715/716 |
| 7,039,940 | B2* | 5/2006 | Weatherford | 725/112 |
| 7,065,709 | B2* | 6/2006 | Ellis et al. | 715/719 |
| 2002/0053089 | A1* | 5/2002 | Massey | 725/135 |
| 2002/0059640 | A1* | 5/2002 | Rafizadeh | 725/135 |
| 2002/0124048 | A1* | 9/2002 | Zhou | 709/203 |
| 2002/0129361 | A1* | 9/2002 | Arita et al. | 725/23 |
| 2002/0178442 | A1* | 11/2002 | Williams | 725/13 |
| 2003/0020744 | A1* | 1/2003 | Ellis et al. | 345/723 |
| 2003/0146940 | A1* | 8/2003 | Ellis et al. | 345/811 |
| 2004/0083490 | A1* | 4/2004 | Hane | 725/46 |
| 2005/0160458 | A1* | 7/2005 | Baumgartner | 725/46 |
| 2005/0262542 | A1* | 11/2005 | DeWeese et al. | 725/106 |
| 2006/0136965 | A1* | 6/2006 | Ellis et al. | 725/46 |

OTHER PUBLICATIONS

"American Idol"—Fox Broadcasting Company, broadcast television programming and Internet website (Fox.com).
"Big Brother"—CBS Broadcasting Inc., broadcast television programming and Internet website (CBS.com).
"CSI"—CBS Broadcasting Inc., broadcast television programming and Internet website (CBS.com).
DawsonsDesktop.com.
"Friends"—NBC (National Broadcasting Network) and/or Warner Brothers; broadcast television programming and Internet website (NBC.com).

(Continued)

*Primary Examiner*—Joseph P Hirl
*Assistant Examiner*—Jivka Rabovianski
(74) *Attorney, Agent, or Firm*—Pillsbury Winthrop Shaw Pittman LLP

(57) ABSTRACT

Embodiments of the present invention are described in which a plurality of mediums are selectively programmed with media content to provide an integrated entertainment experience to consumers. The content that is provided on different mediums is synchronized to provide different events, perspectives or experiences associated with a common storyline. Additional embodiments of the present invention are described in which commercial sponsorship of a program is provided within a storyline, such that sponsors are identified for purposes of brand recognition, or products and services from the sponsor are advertised/marketed or otherwise made directly available for purchase by consumers through synchronized programming of media content among a plurality of mediums.

18 Claims, 16 Drawing Sheets

OTHER PUBLICATIONS

"Survivor"—CBS Broadcasting Inc., broadcast television programming and Internet website (CBS.com).
"The Sopranos"—HBO Cable Network.
"The Mole"—ABC (Australian Broadcasting Commission); broadcast television programming and Internet website (ABC.com).
"Bit Screen, The"—video-film only.
"BreakTV"—video-film and TV, supporting show information.
"Brilliant Digital Entertainment"—video-interactive animated features and adventures (games).
DEN.com—video-web original.
"Entertaindom" (Warner Bros.)—video-film.
Icebox.com—video-animation.
TheOnion.com—text.
TheSync.com—video-film, TV; audio.
Wirebreak.com—video-TV.
"Small Town X"—Fox Broadcasting Company, broadcasting television programming and Internet website (Fox.com).
Visitpush.com.
"AtomFilms/Shockwave"—video-film only.
POP.com—video film shorts, comedy, web original.
The Spot.com—online experience.
Z.com—video web original.

* cited by examiner

FIG. 2B

|  | WEB RADIO | TV | E-NEWS-PAPER | E-MAIL A | E-MAIL B | E-MAIL C | E-MAIL D |
|---|---|---|---|---|---|---|---|
| SEG 1 |  | $X_1$ | $X_2$ |  |  |  |  |
| SEG 2 |  |  |  |  | X |  |  |
| SEG 3 | $X_1$ |  | $X_1$ |  |  |  |  |
| SEG 4 | X |  |  |  |  |  |  |

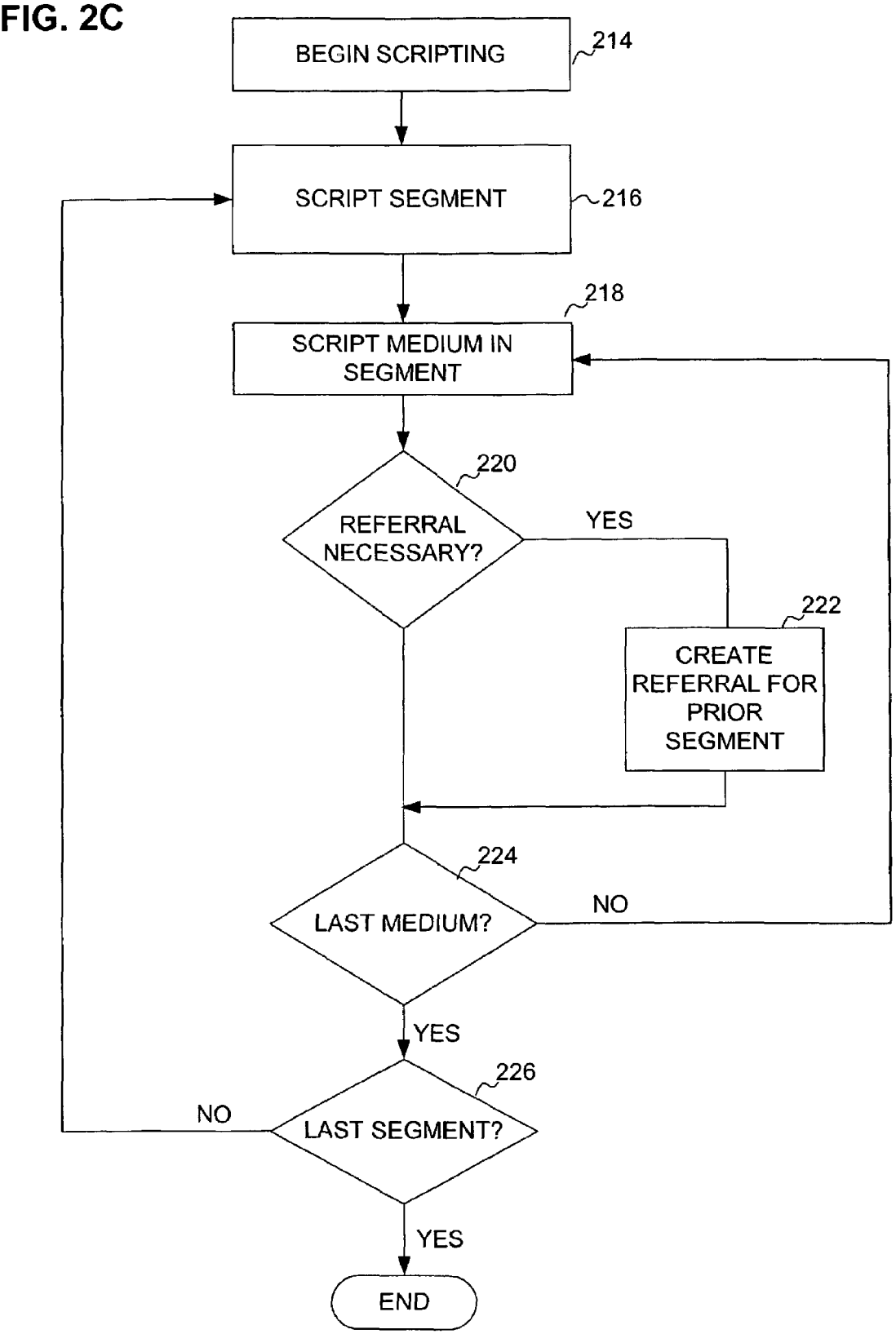

STORY, ENTERTAINMENT AND INFORMATION ZONES
ZONE: SCHOOLS

| DESCRIPTION | IMPLEMENTATION METHODS AND EXAMPLES |
|---|---|
| The "SCHOOLS" Zone, located on the main Boonsburg.com home page, represents the various school/educational segments found within the Boonsburg Community, and offers the viewer access to the individual efforts that those schools are contributing to the overall Boonsburg.com experience. | The School Zone will contain various sub categories. These include:<br><br>Boonsburg High School - Much of the town's web content will come from, and or be built with, the aid of the High School Students. The Mayor sees their involvement as a win-win for the town. Not only is it a great way to give students an alternative to drugs while utilizing their talents, it also offers them the chance to provide a valuable community service. One, which the Mayor believes, will help develop professional skills that could create employment opportunities for them in the future. Much of the High School's web efforts will be done under the guidance/help of teachers like Kylish, Jonas, Geri, and Freddie.<br><br>Examples of content, efforts and elements the students create and provide include:<br><br>Content/Entertaiment:<br>"Jonas and Geri Show" – A weekly mini exercise program featuring the gym teachers<br>Online Movie Review Show – Young people reviewing what they want/have seen<br>Comedy Sketch Show – Short downloadable sketches<br>"Woodworking with Kylish" – Woodshop teacher hosts a mini woodworking show<br>"Cyber Chaperone" – Freddie's weekly "Chaperone's State of the Union" address<br>Web Interview Show – Kids interview business leaders or celebrities who visit town<br>"The Party Starters" – Two funny kids who offer their own paper and video clips<br>Short films and videos made by students in the town<br>Boonsburg High Radio – 4 hours of radio programming that repeats throughout the day<br>Sports Talk – Young people covering sports<br><br>News and Information:<br>Morning Announcements - 3 minutes of video news broadcast each day over the web<br>"The Mutant" – The school's online paper that morphs<br>Virtual Yearbook – A continuously growing collage of the school year<br>Student Council Page<br>French, German, Spanish, clubs – Offer school info in that particular language |

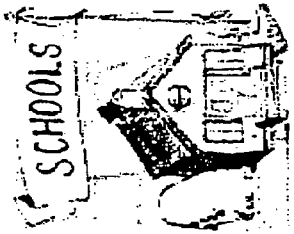

FIG. 3A

STORY, ENTERTAINMENT AND INFORMATION ZONES
ZONE: GOVERNMENT

| DESCRIPTION | IMPLEMENTATION METHODS AND EXAMPLES |
|---|---|
| The "GOVERNMENT" Zone, located on the main Boonsburg.com home page, represents the various governmental departments/segments found within the Boonsburg Community, and offers the viewer access to each department's individual efforts which contribute to the overall Boonsburg.com experience. 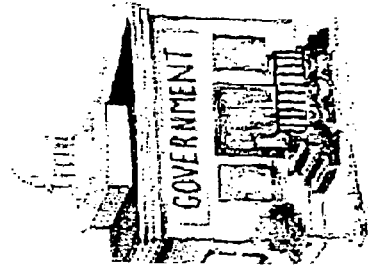 | As in any town, there are various elements of government that play an essential part in the Boonsburg.com experience. These elements, the roles they play and the people/characters involved include:<br><br>Mayor's Office:<br>As the catalyst of all of the town's web activities, the Mayor, Dee Block, is the town's main cheerleader. Besides running Town Council meetings live/via the web the first Monday of every month, she also does her weekly "State of the Union" Address online – filling everyone in on the town's progress and laying out the next steps. She also relies on the advice of local and visiting business leaders (like Tom Mendiburu, Andy Unanue, etc.) as she leads the town through uncharted waters. Interested in working with the youth of the town, the Mayor holds regularly scheduled open dialogues with young people, which not only helps her see the future, but also gets her to "think young."<br><br>Town Manager:<br>This person controls the purse strings of the town and all of its web efforts. Usually the thorn in the side of most small towns, this office will be more of a "no, we can't afford it" attitude than a "yes, let's go all out." Town budgets or concerns will be posted on the Town Manager's site.<br><br>Chamber of Commerce:<br>Made up of a coalition of all of the businesses in town, the Chamber of Commerce is a pretty lame group, though they think they are the backbone of the community. Basically it is made up of some small mom and pop shop people, with a few "rich" people thrown in (as in, they're used to being the big fish in this small pond). For the most part, the Chamber usually votes against anything that costs money, could be fun, or could possibly lessen any power they might have.<br><br>Town Council:<br>Viewed as the towns peoples' candidates, most who get on the Town Council end up voting the way of the money. Rarely do any of these people make a difference, and anytime someone |

FIG. 3B

STORY, ENTERTAINMENT AND INFORMATION DELIVERY MEDIUMS
DELIVERY MEDIUM: RADIO

| DESCRIPTION | IMPLEMENTATION METHODS AND EXAMPLES |
|---|---|
| The "RADIO" Delivery Medium is used to communicate various elements of the Boonsburg.com integrated entertainment experience -- including story, character, advertising, commerce, information, entertainment, etc. -- replicating the exact feel and experience of Radio as it exists in its traditional form. | The Boonsburg.com town website will feature several radio stations broadcasting from within the town's borders; other stations may be added over time.<br><br>Types of Stations<br><br>High School Radio Station: This net station is run by the high school students. Its musical tastes will range from Top 40 to underground and cover occasional discussions on topics that are important to today's young crowd. (Debates such as "should the teachers be allowed to search your locker when we can't search theirs?" etc.) The DJs will be students from Boonsburg High School. They will produce their own segments and record their own commercials for local sponsors. Since they are still in school, the radio show will be approximately 4 hours of programming each day, and will repeat over and over until the next day's programming begins. The news that is reported by the students will always be reported from their point of view.<br><br>College Radio Station: This will be more of a hip type of station – very eclectic in its musical choices (such as Jazz, Punk, Funk, Fusion, etc.), featuring content that is relevant to the young college crowd. Its advertising and sponsorship will also match its eclectic feel. DJs will be more worldly on events, and speak for longer periods of time. Discussions can break out at any moment (such as "should tuition be increased to cover the new added costs of security?," etc.) The news that is reported will always be from their specific point of view.<br><br>Religious Station: Started by a coalition of local religions, this net station will offer listeners a more spiritually appealing alternative. The DJs will be from each individual religious group, and collectively, they will feature more positive musical choices. They will also have sponsors more aligned with their world views, and, their news reporting will be done from their higher moral point of view.<br><br>Main Adult Station: Basically playing a mix of Country and Rock, WBRG is that middle of the road station that can be enjoyed by everyone. Its news and advertising are pretty much like any other station around the country. |

FIG. 3C

STORY, ENTERTAINMENT AND INFORMATION DELIVER MEDIUMS
DELIVERY MEDIUM: E-MAIL

| DESCRIPTION | IMPLEMENTATION METHODS AND EXAMPLES |
|---|---|
| The "E-MAIL" Delivery Medium is used to convey story and character by utilizing e-mail in its traditional format and manner, but for other purposes such as, entertainment, revealing character details, and story points. | E-mail is used to personalize the Boonsburg.com experience and to interact with viewers in entertaining, informative and sometimes even scandalous ways. Examples include: |
| | From "Boonsburg Cards and Gifts," Dotty will send an e-mail to Eloise regarding what time she thinks Eloise should pick her up so that they can head down to the Meadowlands for a huge Ford event. Dotty will tell Eloise that she wants to look at the new Lincoln Continental, since she thinks she might want to buy one - one day. But, when Dotty sends the letter, she accidentally hit "Send All" and inadvertently mails it out to every single person who is on the card shop's e-mail list. Moments later Dotty sends another e-mail that says "Opps, please ignore that last e-mail, I accidentally hit "Send All." In the next day's paper Dotty's goof might end up making the front page. And a bunch of people may show up to actually see Dotty at the event. |
| | If someone buys a book from "Buy The Book," the Boonsburg bookstore, they might receive an e-mail from the character they know who works there that says "Thank you very much for purchasing your book through our store. We hope you like the book, but if you have any problems, please let us know." Later, if the person realizes they have no need for the book, they might e-mail back and ask what the store's return policy is. They might then receive an e-mail back from the character that says "You know, we really don't like to take books back, since you might have read it in the bathroom..." |
| | As happens everyday with e-mail, there is always one person who puts you on their e-mail tree and sends you hundreds of jokes. In Boonsburg, the same type of characters exist, and, if a Virtual Resident would like, they can sign up to be on the "Forwarding Joke Guy's" e-mail tree (or, you just might find you ended up on it without ever asking, and all of your friends who aren't on it will beg you to please forward his e-mails over to them). If you scroll down his forwarded e-mail, you might find that the joke he just sent you had been sent from Pete at "Pete's Appliance," to Charlie Thorn the former Fire Marshall, to the "Forwarding Guy," and then to you. Or, you might get on the town gossip's e-mail tree and learn a whole lot of dirt about a whole lot of town residents. The wonderful thing about these e-mail trees is that you'll see your e-mail address listed right next to Dotty's or another character you know - and you'll |

12 MONTH STORY DEVELOPMENT AND IMPLEMENTATION PLAN - OVERVIEW

| Story Number: 01-01<br>Description: Town's first year | Character:<br>Advertiser: | Notes: Town story pre-pilot and after- |
|---|---|---|
| APRIL 2003<br>Tom Mendiburu makes donation to Boonsburg College<br>Town is dying - Town Council asks citizens for ideas | MAY 2003<br>Tom Mendiburu tells town to go online<br>Mayor loves Mendiburu's idea - Town Council balks<br>Mendiburu convinces them to try<br>Boonsburg College agrees to work with town | JUNE 2003<br>Mayor rallies students to help make content<br>Mayor taps Randall Fitzsimmons to lead effort<br>Carmen Finestra speaks at Boonsburg College |
| JULY 2003<br>Town businesses and residents slowly begin to put up sites<br>Carmen Finestra talks to network, they want TV show | AUGUST 2003<br>Dotty cards become available<br>"Bean" starts training for baseball as his way to help<br>Preproduction of TV show begins | SEPTEMBER 2003<br>School starts - kids prepare web content & net radio<br>Bean speaks to grammar school, local team will see him<br>Mayor and "CyberChaperone" do "State of the Union"<br>Shickhaus, Jonas & Geri begin doing their shows<br>High School's Morning Announcements carried on web<br>Stanley Brock's publicity photos are being stolen<br>The TV show "Boonsburg.com" starts filming |
| OCTOBER 2003<br>Mayor wants to change town name to "Boonsburg.com"<br>Randall Fitzsimmons will run for Town Council<br>Fire Dept. restores old Steamer – wheel gets stolen<br>The first episode of "Boonsburg.com" airs<br>"Bean" becomes star – network wants more of him<br>A bear steals pizza delivery guy's car<br>College kids begin celebrating "Brocktoberfest"<br>While batting a trailer fire, "Bean" loses a leg | NOVEMBER 2003<br>Town rallies together as "Bean" is near death<br>Randall wins Town Council seat<br>Dotty and Randall appear on Letterman<br>Town's ratings are going through the roof<br>Town's Virtual Residents number in the millions<br>The network begins to stunt cast on show<br>Residents begin wanting things like they were before<br>Local video shows now have huge cult followings | DECEMBER 2003<br>Cousin Johnny visits "Bean" - redefines life<br>The town hosts the annual Christmas Parade<br>Businesses are booming on web<br>Locals turn homes into billboards for huge companies |
| JANUARY 2004<br>"Bean" goes home | FEBRUARY 2004<br>"Bean" gets into first play | MARCH 2004<br>"Bean" joins local theater company |

FIG. 3F

3 MONTH STORY DEVELOPMENT AND IMPLEMENTATION PLAN - OVERVIEW

| Story Number: | | Character: "Bean" | | Notes: 12 week goal, Bean ends up getting |
|---|---|---|---|---|
| Description: Young man loses his identity | | Advertiser: | | in commercials as an actor at end |

| WEEK 1: mm/dd/yy - mm/dd/yy | WEEK 2: mm/dd/yy - mm/dd/yy | WEEK 3: mm/dd/yy - mm/dd/yy | WEEK 4: mm/dd/yy - mm/dd/yy |
|---|---|---|---|
| "Bean" speaks to grammar school - "we" can do this, but I'll need your help | "Bean" tells the cameras that he is contributing by instilling a "You can do it" attitude | After show has aired, "Bean" becomes the first breakout celebrity. Network wants more of "Bean" in show | Opportunities knock for "Bean". During fire, saves girl, loses leg |
| TV | TV Pilot Episode | TV Episode 2 | TV Episode 3 |
| WEEK 5: mm/dd/yy - mm/dd/yy | WEEK 6: mm/dd/yy - mm/dd/yy | WEEK 7: mm/dd/yy - mm/dd/yy | WEEK 8: mm/dd/yy - mm/dd/yy |
| "Bean" is near death. Town holds blood drive. All town's media cover his struggle. Grammar school kids hold vigil | "Bean" begins to stabilize. Fire Dept. Inquiry starts | "Bean" better, but violent - throws things | "Bean" tries to kill self |
| TV Hiatus Week - Rerun | TV Episode 4 | TV Episode 5 | TV Hiatus Week - Rerun |
| WEEK 9: mm/dd/yy - mm/dd/yy | WEEK 10: mm/dd/yy - mm/dd/yy | WEEK 11: mm/dd/yy - mm/dd/yy | WEEK 12: mm/dd/yy - mm/dd/yy |
| Cousin Johnny pays a visit - helps redefine "Bean's" life | "Bean" leaves hospital | "Bean" asked to join handicapped theater company in NYC | Begins attending acting classes. Gets first commercial audition |
| TV Hiatus Week - Rerun | TV Episode 6 | TV Hiatus Week - Rerun | TV Hiatus Week - Rerun |

FIG. 3G

WEEKLY STORY DEVELOPMENT AND IMPLEMENTATION PLAN - DELIVERY MEDIUMS

| Case Number: | 1 | Story Number: | 01-01-01-01 |
|---|---|---|---|
| 6 Pack Number: | 1 | Description: | Athlete Fireman Loses Leg |
| Can Number: | 1 | Character: | "Bean" |
| Week: | TBD | Advertiser: | |

| DELIVERY MEDIUM | WEDNESDAY mm/dd/yy | THURSDAY mm/dd/yy | FRIDAY mm/dd/yy | SATURDAY mm/dd/yy | SUNDAY mm/dd/yy | MONDAY mm/dd/yy | TUESDAY mm/dd/yy | WEDNESDAY mm/dd/yy |
|---|---|---|---|---|---|---|---|---|
| RADIO | | | | | | | | |
| NEWSPAPER | | Kid Page "Bean" talks to students "we" can do it | | | | | "Local Boy Doing Good" article "Bean" shown with school kids | |
| COMMERCE | | | | | | | | |
| CALENDAR | | | | | | | | |
| PROMO | | | | Shot of "Bean" working out with shirt off | | | | |
| TELEVISION All Stuff In This Section Appears In The Show On Wednesday Night | | See "Bean" running with kids following | | | | | | |
| ADVERTISER | | | | | | | | |
| NOTES / OTHER | | Grammar school website - interview "Bean" | | | | Grammar school kids update his stats | | |

FIG. 3H

WEEKLY STORY DEVELOPMENT AND IMPLEMENTATION PLAN - DELIVERY MEDIUMS

| Case Number: | 1 | Story Number: | 01-01-02-02 |
|---|---|---|---|
| 6 Pack Number: | 1 | Description: | Bear story |
| Can Number: | 2 | Character: | Andy Unanue |
| Week: | TBD | Advertiser: | Goya Foods |

| DELIVERY MEDIUM | WEDNESDAY mm/dd/yy | THURSDAY mm/dd/yy | FRIDAY mm/dd/yy | SATURDAY mm/dd/yy | SUNDAY mm/dd/yy | MONDAY mm/dd/yy | TUESDAY mm/dd/yy | WEDNESDAY mm/dd/yy |
|---|---|---|---|---|---|---|---|---|
| RADIO | | Report of stolen car - then car hits house - then bear driving - trapped | Debate of what should be done with the bear | Are the residents safe with bears around | | Topic: Should underage bears be allowed to drive? | | |
| NEWSPAPER | | | | | "Bear Saves Man's Life" Unanue interviewed | | "Airbag Saved Bears Life" | |
| COMMERCE | | | Pizza Parlor features "Bear's Choice" pizza | | | | | |
| CALENDAR | | | | | | | | |
| PROMO | | | People checking out Monkeemobile | | | | Pizza delivery says "orders are way up" | |
| TELEVISION All Stuff In This Section Appears In The Show On Wednesday Night | | Bear being saved Unanue "The bear swerved" saving Monkeemobile | | | | | | |
| ADVERTISER | | | | | | | | |
| NOTES / OTHER | | Andy Unanue to speak at Lecture Series | CHAT - Was bear a fan of Monkee's TV show? | | | | | |

FIG. 3I

ONE DAY STORY DEVELOPMENT AND IMPLEMENTATION PLAN
DATE:   mm/dd/yy

| Story Number: 01-01-01-01 | | Character: "Bean" | | Notes: | Day after "Bean" loses leg |
|---|---|---|---|---|---|
| Description: Athletic Fireman Loses Leg | | Advertiser: | | | |
| 12:00 a.m. | Surgery | 8:00 a.m. | Surgery Radio Update | 4:00 p.m. | |
| 12:30 a.m. | Surgery | 8:30 a.m. | Surgery | 4:30 p.m. | |
| 1:00 a.m. | Surgery Radio Update | 9:00 a.m. | Surgery | 5:00 p.m. | |
| 1:30 a.m. | Surgery | 9:30 a.m. | Surgery Radio Update | 5:30 p.m. | |
| 2:00 a.m. | Surgery | 10:00 a.m. | Surgery | 6:00 p.m. | |
| 2:30 a.m. | Surgery | 10:30 a.m. | Surgery | 6:30 p.m. | |
| 3:00 a.m. | Surgery Radio Update | 11:00 a.m. | Leg reattached Radio Update | 7:00 p.m. | |
| 3:30 a.m. | Surgery | 11:30 a.m. | Guarded condition | 7:30 p.m. | |
| 4:00 a.m. | Surgery | 12:00 p.m. | Friends and family hold a vigil at hospital | 8:00 p.m. | |
| 4:30 a.m. | Surgery Radio Update | 12:30 p.m. | Radio updates - interviews people at the scene | 8:30 p.m. | |
| 5:00 a.m. | Surgery | 1:00 p.m. | Mayor makes statement rallying residents to help "Bean" | 9:00 p.m. | |
| 5:30 a.m. | Surgery | 1:30 p.m. | | 9:30 p.m. | |
| 6:00 a.m. | Surgery Radio Update | 2:00 p.m. | | 10:00 p.m. | |
| 6:30 a.m. | Surgery | 2:30 p.m. | | 10:30 p.m. | |
| 7:00 a.m. | Surgery | 3:00 p.m. | | 11:00 p.m. | |
| 7:30 a.m. | Surgery | 3:30 p.m. | | 11:30 p.m. | |
| TV | | | | | |

METHOD AND SYSTEM OF MEDIA PROGRAMMING TO PROVIDE AN INTEGRATED ENTERTAINMENT EXPERIENCE

This applications claims the benefit of U.S. Provisional Application No. 60/330,545 filed Oct. 24, 2001, which is incorporated herein by reference in its entirety.

BACKGROUND

1. Field of the Invention

The present invention relates generally to media programming for consumer entertainment and to the provision of entertainment programming as a medium for marketing goods and services to consumers.

2. Background of the Invention

1. Television Industry Overview

In the early years of television, networks sold entire blocks of airtime to corporate sponsors, who in turn assumed responsibility for covering all costs associated with producing a desired program to be aired during a sponsor's purchased time slot. Typically, advertising agencies were brokers through which sponsors and networks negotiated programming details such as sponsorship pricing and the selection of a time slot (i.e., day and time that the program would be aired), the program's subject matter, and which actors were to star in the program. In return for sponsorship, television programs were named after the respective sponsor (e.g., "Admiral Broadway Revue" and "Texaco Star Theater") to improve a sponsor's brand recognition and marketability amongst a national viewing audience.

Continuing into the 1950's, television programs were live broadcasts that were aired only once to the viewing public. Unlike movies, which were carefully scripted and created over periods of months or even years, television programs were created much more quickly as daily or weekly episodes. Live broadcasts were associated with a sense of excitement and cache that attracted viewers, and accordingly, television networks did not believe that viewers would be interested in seeing re-broadcasts of filmed television programs. However, beginning with the filming of the "I Love Lucy" show (which apparently was filmed only because its stars, Desi Arnez and Lucille Ball, desired to reside in Los Angeles despite that "live" television cameras and broadcast transmitters were available only in New York at the time), a market began to develop for re-broadcasting taped television programs and eventually blossomed into syndicated television programming.

As television became a more established medium for entertainment in the late 1950's, actors' salaries and television production costs continued rising to a level for which fewer sponsors desired to cover the entire expense associated with a program. At the same time, to fill "dead air time" when no sponsored program was scheduled, networks began producing programs that had no sponsorship at all, with the hopes of creating viewer interest that would attract an advertising sponsor in the future. In 1960, television network NBC created a "magazine show" format in which multiple advertisers shared the costs of sponsoring a specific television program. Instead of carrying the burden of sponsoring an entire show, advertisers purchased one or more 30 second breaks in time to air a commercial for marketing the sponsor. This format soon became the standard for network broadcast television, and aside from the "subscription" model provided by some cable television networks, it remains the predominate format for sponsorship of television programs today.

2. Overview of how Television Shows are Typically Produced by Television Networks Present-day television programs are usually developed either by independent television production companies or by television networks themselves. An idea for a television program is usually generated by creators ("executive producers") who, in the case of independent production companies, are represented by agents that sell the concept to networks or studios. In either case, the shows are "pitched" to networks to commission a "pilot" for the show to evaluate an initial script. Whether the pilot and any additional episodes are ever aired on a network depends in part upon the subjective opinions of network executives and the marketability of the television show concept amongst prospective viewers and advertising sponsors.

The costs of production and proceeds from a television show are respectively borne and distributed depending upon who is "producing" the program. Often, a television "studio" may pay the costs of producing a program for a network, including the creative writing and production staff, in return for receiving a license fee from the network for the right to air the show, along with a percentage of any potential syndication proceeds. The network then sells advertising spots during the television show with the expectation that advertising revenues will exceed the license fees and other network-related expenses. Unless negotiated otherwise, the network usually decides when to schedule the airing of the program and for how long the show will air.

3. Categories of Television Programming

Although television is continually exploring new and innovative themes and stories as an entertainment medium, the basic format of a television program traditionally has typically been associated with one of a few well-defined categories consisting of situational comedy, dramatic series, mystery, news and information/variety show. While the plot for some television programs successively develops and unfolds over course of different episodes (e.g., soap operas), other television programs explore a new story or situation in each succeeding episode that is experienced by a common cast of characters, with only an occasional reference back to earlier stories (e.g., situational comedy). In either case, the primary intention of the television network is to develop and grow a loyal viewing audience of interest to corporate advertising sponsors who pay for commercial breaks in programming.

As Americans become increasingly inundated by various types of entertainment media, entertainment providers strive to devise unique programming to capture the attentions of their audiences. For example, television networks recently have created "participation" programming themes in which non-actors participate in a show or members of the audience vote to determine the outcome of the program. For some television shows, networks additionally have sponsored Internet websites to provide a resource for viewers to learn about actors or review recaps of past episodes.

One type of participation programming that is currently popular among television networks is described as "reality-based" television programming, where non-actors are placed in a fabricated environment. Most reality-based shows offer publicity or prizes to lure participants into joining the show. The participants typically are then immersed in a competition in which they are willing to behave absurdly to win the valuable prize. Viewers also enjoy the novelty of watching "real" people and seeing how they react under a series of unique circumstances. Due to the competitive nature of the program, viewers are likely to stay tuned so they can see which contestant is leading the competition.

"Audience participation" shows featuring another type of participation-based television programming in which viewers are enabled to contact the television network via telephone to vote and assist in determining the direction that the show takes. Audience participation television programs typically involve a competition where the audience determines the winner. As with reality-based shows, viewers are enticed to watch every episode of audience participation shows in order to see who is leading the competition. These shows also draw in viewers because they feel significant to the show and have a responsibility to ensure that the most deserving contestant wins the prize. In a variation of this theme, the audience is able to assist a game-show contestant.

With the advent of the World Wide Web, some television networks provide internet websites to foster additional interest in certain television shows. Most commonly, such internet sites contain information such as program schedules, summaries of past episodes, and information about the actors, the writers, etc. These materials may be considered to be useful by viewers who are interested in learning more about a television show. By providing re-caps of prior shows, viewers can stay up-to-date with a storyline even if they miss an episode.

4. Other Forms of Sponsorship

There are other known forms of forms of media sponsorship or "sponsorship elements." The term "sponsorship element" means marketing material that forms part of, or is superimposed on, broadcast program material and includes (but is not necessarily limited to) on-screen corner logos, opening and closing billboards, stings, squeezebacks, the on-air depiction of, or referral to, any brand, product or name, ribbons and crawls, naming rights, and product placements. "Product placement" refers to the depiction of, or a reference to, a product or service in material (other than an advertisement) broadcast, in visual and/or audio form, in respect of which the broadcaster and/or the producer of the material concerned receives payment or other valuable consideration, and which promotes the interests of any person, product or service.

5. Challenges Presently Encountered in Television Programming and Production

Similar to the problems in the television industry of the late 1950's as described above, actors' salaries and television production costs are continuing to rise, but now to a level at which sponsorship through television commercial breaks is often insufficient to cover the entire expenses associated with a program. As a result, it often is simply too expensive to risk producing a television show that involves new or untested themes and formats, since production of an unsuccessful program could bankrupt a studio and harm a network's image and profitability. At the same time, with increased competition from cable television stations and new broadcast networks, along with popularity of other entertainment diversions such as video games and continually-developing, Internet-based entertainment media, producers are pressured to continually create new and innovative types of entertainment programming to increase market share.

Traditional television advertising also faces technical challenges. New services like TiVo are being hailed as the "slayers" of traditional television commercials and mass-market branding. Such services provide "personal TV" that enables viewers to pause live television programming and watch what they want when they want, as so-called time-shift programming. Most significantly for advertisers is that personal TV enables viewers to skip commercials. The technology is so powerful that even if the early providers never win mainstream acceptance, traditional television advertising ultimately will be upended. Accordingly, there is a strong need for both new programming formats for consumer entertainment and improved methods and systems for commercial sponsorship of entertainment programming.

In response to these challenges, some have suggested increasing integration of advertising into media content. One approach has been a targeted advertising approach. In place of traditional commercials, personal TV services offer broadcasters new ways of reaching audiences by targeting individual households with specially-tailored commercials or sponsored programming, or by establishing interactive services or building brand identity through clever product placement. Personal TV technology provides an opportunity for advertisers to deliver a targeted message by storing consumers' particular viewing habits in hard drive memory that is embedded in each service's set-top box. The hard drive stores consumers' digitally recorded programs and the service's interactive program guides. Each night, the guides are automatically downloaded from the service's headquarters through a telephone or cable connection. This information can be used to target a household with advertisements that are believed to be relevant to the particular consumers who are watching (e.g., kayaking commercials instead of spots for computer equipment).

Some have suggested that the 1998 film The Truman Show was a prescient look at the future of advertising. The movie is a story of an always-running live TV show, similar to voyeuristic Web cams and reality programming like Survivor and Big Brother. In the film, actors and actresses on the "live TV show" tote products within the television show itself as scripted product placements intended to develop brand identity (e.g, actress holds up two cups of "Action Coffee" while wearing an "Action Coffee" apron). The show's producers rely upon such product placements for revenue because the concept of their show—which is to be aired 365 days a year, 24 hours a day—precludes commercial interruptions.

SUMMARY OF THE INVENTION

Embodiments of the present invention are described in which a plurality of mediums are selectively programmed with media content to provide an integrated entertainment experience to consumers. The content that is provided on different mediums is synchronized to provide different events, perspectives or experiences associated with a common storyline. Media content that is provided on one medium may reference (explicitly or implicitly) to content that is provided on other mediums to encourage consumers to access different mediums to enhance their experience and follow the development of the storyline.

In a preferred embodiment, a plurality of mediums are programmed to provide related media content in a manner that enables consumers to experience a continuously evolving storyline, as a simulated reality. The storyline includes combinations of fictional scripted stories with actual live events, portrayed by both fictional characters and non-actors, to present a multi-dimensional story that consumers experience by accessing different coordinated mediums that have synchronized media content. Media content is updated on different mediums with sufficient frequency (e.g., similar to morning and afternoon versions of a newspaper) such that consumers can access different mediums when desired to experience a simulated reality.

As one aspect of a preferred embodiment, a consumer can enter a portal that provides centralized access to media content relating to events or activities experienced by a plurality of characters in an evolving storyline. The media content is programmed into a plurality of mediums that can be individually accessed through the portal, and each medium represents a different mode for delivery of media content in a different format (e.g, newspaper, webcast, web radio, e-mail, etc.). The programming of the mediums is synchronized together such that media content that is accessed at different mediums at any given time period relates to events or activities that occur within the storyline during that time period. The programming of media content is distributed among the plurality of mediums such that no single medium captures each event or activity that occurs during the same time period in the storyline. New and updated media content is programmed into different mediums in varying intervals to advance the development of the storyline over the course of time. In this manner, a consumer can access different mediums to experience different aspects or components of the storyline that is particularized for each consumer depending which mediums are accessed and at which times, to enjoy an integrated entertainment experience.

Embodiments of the present invention are described in which a plurality of mediums are selectively programmed with media content to provide an integrated entertainment experience to consumers. The content that is provided on different mediums is synchronized to provide different events, perspectives or experiences associated with a common storyline.

Additional embodiments of the present invention are described in which commercial sponsorship of a program is provided within a storyline, such that sponsored products are identified for purposes of brand recognition. For example, this can be performed by inserting an actual person who is affiliated with the sponsor as a character within the storyline, to provide opportunities to increase brand identity and goodwill. As a further embodiment, products and services from the sponsor can be are advertised/marketed or otherwise made directly available for purchase by consumers through synchronized programming of media content among a plurality of mediums. The storyline can be created or modified in accordance with changes in commercial sponsorship.

BRIEF DESCRIPTION OF THE DRAWINGS

FIG. 2B is a chart illustrating the selection of mediums to communicate entertainment-related media content information in accordance with an embodiment of the present invention.

FIG. 2C is a flow diagram of steps for determining whether to script a referral in accordance with an embodiment of the present invention.

FIG. 3A is a template of a chart listing different "zones" of experiences that contribute to a theme or storyline, in accordance with an embodiment of the present invention, with exemplary entries provided therein.

FIG. 3B is a template of a chart listing different "zones" of experiences that contribute to a theme or storyline, in accordance with an embodiment of the present invention, with exemplary entries provided therein.

FIG. 3C is a template of a chart listing different mediums that can provide for a particular theme of a storyline, in accordance with an embodiment of the present invention, with exemplary entries provided therein.

FIG. 3D is a template of a chart listing different mediums that can provide for a particular theme of a storyline, in accordance with an embodiment of the present invention, with exemplary entries provided therein.

FIG. 3E is a template of a chart of a twelve month story development and implementation plan, in accordance with an embodiment of the present invention, with exemplary entries provided therein.

FIG. 3F is a template of a chart of a three month story development and implementation plan, in accordance with an embodiment of the present invention, with exemplary entries provided therein.

FIG. 3G is a chart of a template of a chart of a weekly story development and implementation plan, in accordance with an embodiment of the present invention, with exemplary entries provided therein.

FIG. 3H is a chart of a template of a chart of a weekly story development and implementation plan, in accordance with an embodiment of the present invention, with exemplary entries provided therein.

FIG. 3I is a chart of a template of a chart of a one day story development and implementation plan, in accordance with an embodiment of the present invention, with exemplary entries provided therein.

DETAILED DESCRIPTION OF THE PREFERRED EMBODIMENTS

Several embodiments of the present invention relate to methods and systems by which a plurality of "entertainment mediums" are selectively programmed with related media content to provide an integrated entertainment experience to an audience. A medium can consist of any mechanism or mode for communicating media content to an audience, which can include both conventional media delivery systems (e.g., television or radio) and systems for communication that are not generally associated with communicating entertainment-related media content (e.g., telephones, post mail, and reality placements). A live, actually-occurring activity or event (e.g., professional baseball game, speech at a political assembly hall, etc.) cannot necessarily be programmed to include content from a fictional storyline, but can be programmed with "related media content" by coordinating to ensure a particular outcome (e.g., arranging for a fictional character to appear at the live event) or otherwise left to chance as "reality-programming" (e.g., actor portraying fictional character actually tries to sneak into sold-out concert).

Mediums may be comprised of a plurality of "sub-mediums," each of which can be programmed separately and from which consumers can receive different media content. As examples, a "television" medium can include several television stations or programs, an "e-mail" medium may include different e-mail addresses, and a medium for "radio" could be comprised of several radio stations. Each sub-medium within a medium may be associated with, for example, a different character in a cast (e.g., different e-mail addresses for different characters), a different perspective or interpretation of events that occur in the storyline (e.g., a liberal and a conservative newspaper), or different live events (e.g., Super Bowl, Wimbledon).

As will be explained below in further detail and with reference to the accompanying figures, the programming of the mediums can be synchronized together such that media content that is accessed from different mediums at any given time period relates to events or activities that occur in a storyline during that time period. Additionally, the programming of media content can be distributed among the plurality of mediums such that no single medium captures each event or activity that occurs during that time period in the storyline.

Exemplary Mediums for Integrated Programming

Figure 1A:
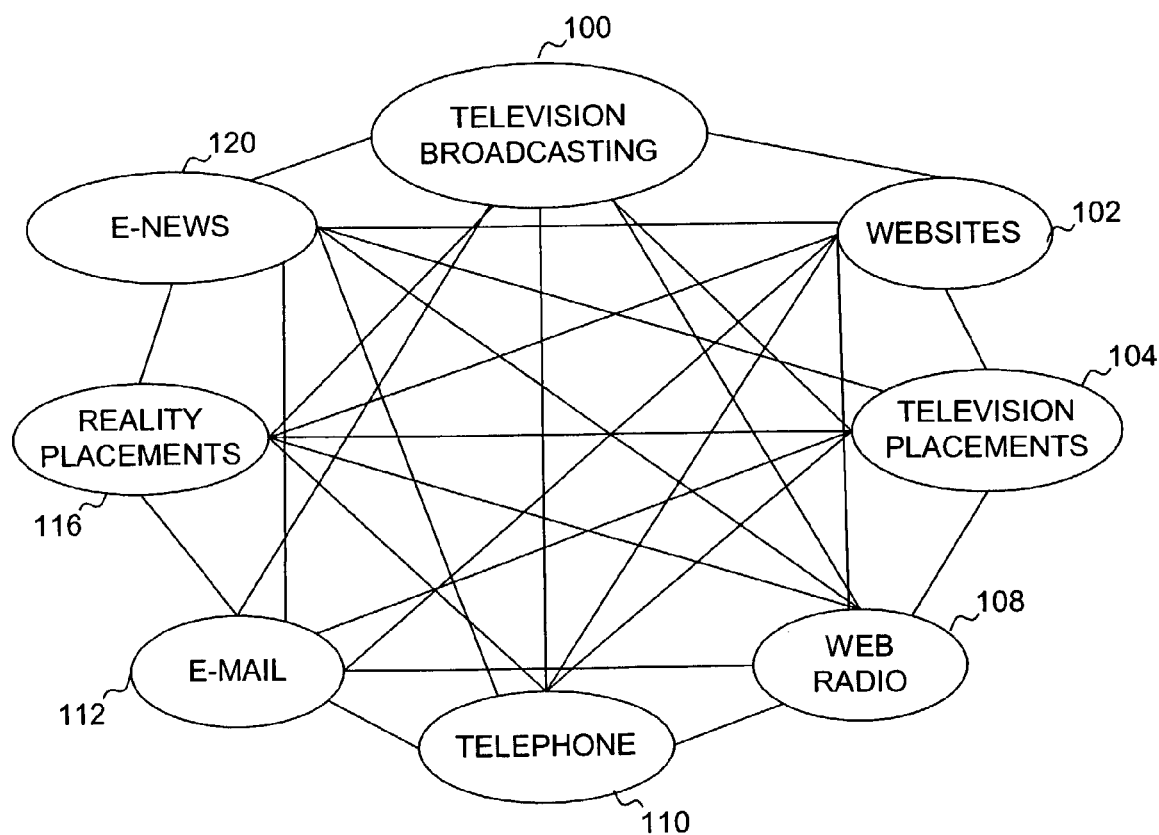
FIG. 1A is a schematic diagram illustrating integration of programming of a plurality of entertainment mediums in accordance with an embodiment of the present invention.
Figure 1B:
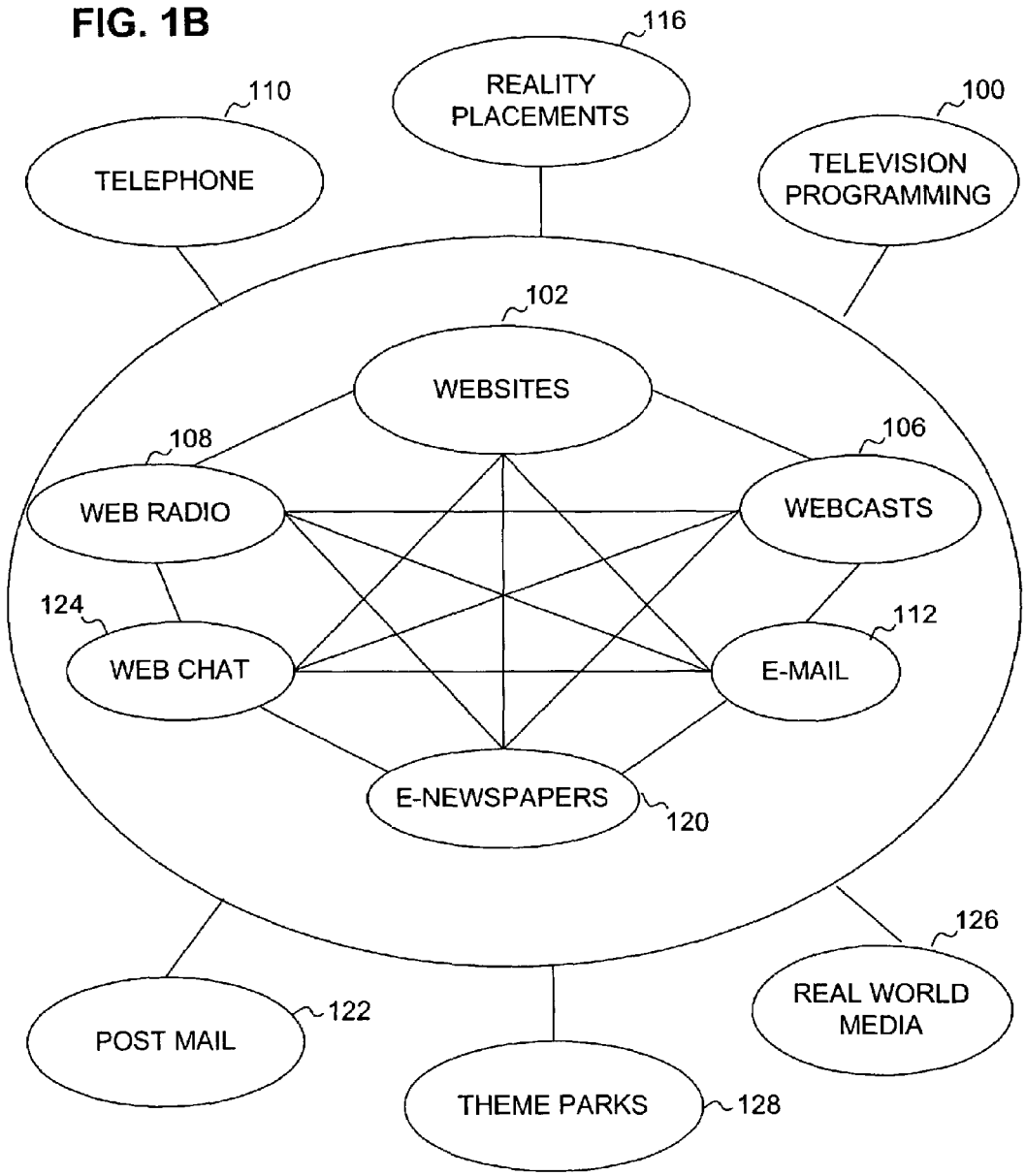
FIG. 1B is a schematic diagram illustrating integration of programming of a plurality of entertainment mediums, where certain entertainment mediums are grouped together as a centralized portal, in accordance with an embodiment of the present invention.

A plurality of entertainment mediums, arranged in FIGS. 1A and 1B, can be programmed with media content to provide an integrated entertainment experience to consumers. The interconnected programming of these different mediums with related media content to provide an integrated entertainment experience can be described through examples. For example, if a storyline in a television program 100 includes a character who constructs a website (or who works at a radio station), a website 102 that is accessible to consumers at that URL (or at a web radio station 108) can be created with related media content that is synchronized to the television program 100. As another example, characters from a webcast 106 can occasionally appear as the same character and in the same role, but on a totally unrelated television show (or on a commercial advertisement during a show) as a "television placement" 104. By integrating programming across these mediums, consumers are referred from one medium to another to continue experiencing the storyline as it progresses.

Producers of a television program can utilize many mediums that are not typically associated with communicating entertainment media to provide a realistic and integrated entertainment experience. As examples, consumers may place telephone calls and hear messages 110 from characters in the storyline, or otherwise may receive letters or other communications from a character through regular post mail 122 or e-mail 112. While consumers may read about related stories in a fictional e-newspaper 120, they may also see characters appear at non-fiction, televised events (e.g., sporting events) as a reality placement 116, or even in an article in a real newspaper 126. By integrating the storyline with real events occurring in a consumer's typical, everyday life (such as receiving mail from a character, seeing the character on television watching the Super Bowl, etc.), the consumer is continuously entertained by the storyline.

There are many other mediums that are capable for inclusion to provide an integrated entertainment experience, and the mediums listed in FIGS. 1A and 1B are not intended to be exhaustive or limiting. Likewise, not all of the mediums represented in FIGS. 1A and 1B are to be utilized in every project and storyline for providing an integrated entertainment experience—mediums that are appropriate for a particular storyline will be utilized and programmed with media content when it is determined that provision of such media content on the medium will enhance consumers' entertainment experience.

Exemplary Integration of Mediums

FIG. 1A is a schematic diagram illustrating integration of programming of a plurality of peripheral entertainment mediums 100-122 in accordance with an embodiment of the present invention. In this embodiment, each of the entertainment mediums may communicate new developments, occurrences, etc. within a storyline, such that no one medium completely captures or is solely responsible for advancing to new content within the storyline. Thus, there is no "central" or "primary" medium. Instead, each medium is logically interconnected to other mediums by being synchronously programmed to provide different developments or aspects of a storyline. The interconnections in the figure represent possibilities of how multiple aspects of a story may be communicated through more than one medium, which tempts an audience member to access these other mediums to follow each advancement of the storyline.

An objective for synchronizing the programming of related media content among a plurality of mediums is to mimic the feel and experience of those mediums as they exist in reality, to enhance a sense of realism in entertainment programming. In real life, one does not experience all news and events through a single source, but instead experiences them continuously through a plurality of mediums (e.g., one may hear a brief announcement of a "breaking news" story on a car radio while driving, and then learn more details through a friend via e-mail, all before reading a more complete version of the story in the newspaper the next day). In contrast, a conventional television show only enables viewers to experience a storyline in standard, hour-long episodes or "snapshots," after which the show and the characters "disappear" until the next episode. Thus, the television medium by itself is not intended to provide the "complete picture"—the viewer cannot visit the town where the characters live in the show and see them at the local bar, etc. However, by synchronizing entertainment programming among a plurality of mediums, the "show" can continually evolve through multiple sources of related media content presented in many different formats. Participating in an integrated entertainment experience, for example, a consumer may tune to a web-radio station operated by a character in the storyline and hear a brief announcement of a "breaking news" story, and then learn more details from an e-mail from a character in the show, before reading a full account of the event in the fictional newspaper the next day. Therefore, as in reality, the different mediums "converge" together on a story to simulate an experience as if it is actually occurring.

Since a consumer may not be inclined to access each of the available mediums, a certain overlap in communicating information from the storyline is included in different mediums to enable the consumer to remain informed and entertained. Referring to an example provided above, although a consumer may miss a radio announcement of a certain event involving a character in the storyline, the consumer can access e-newspaper 120 and read about the event the next day in a newspaper. However, consumers will be tempted to continually access different mediums because the storyline continues to develop over the passage of time.

In the embodiment as illustrated in FIG. 1A, to determine where and when to access related media content from different mediums, consumers may need to be referred from one medium to the next. For example, before accessing such mediums, a consumer needs to know the URL for a website that is associated with a character on the show, the e-mail address and telephone number for another character, and the link for web radio associated with the town where the character lives. This information can be provided explicitly or implicitly, perhaps through the context of the storyline itself as it is scripted.

FIG. 1B is a schematic diagram illustrating integration of programming of a plurality of entertainment mediums in which a subset of entertainment mediums are "centralized" at a common entry point, in accordance with a preferred embodiment of the present invention. In this embodiment, certain mediums can be accessed through a central portal. The media content is programmed into a plurality of mediums that can be individually accessed through the portal, and each medium represents a different mode for delivery of media content (e.g, e-newspaper, webcast, web radio, e-mail, etc.).

As in FIG. 1A, the programming of the mediums is synchronized together such that media content that is accessed from different mediums at any given time period relates to events or activities that occur within the storyline during that time period. However, as a preferred embodiment in FIG. 1B, no referral is required to lead consumers to all web-related mediums, since they are accessed through a common portal. Thus, it might only be necessary (depending upon the circumstances and type of medium) to explicitly or implicitly refer consumers to other mediums that are outside of the portal (such as a character's telephone number).

In each of the illustrations in FIGS. 1A and 1B, all depicted mediums can be substituted with other possible mediums, depending on the context and particular storyline and type of entertainment experience that is being programmed.

Exemplary Steps for Integrating a Storyline Among Different Mediums

Figure 2A:
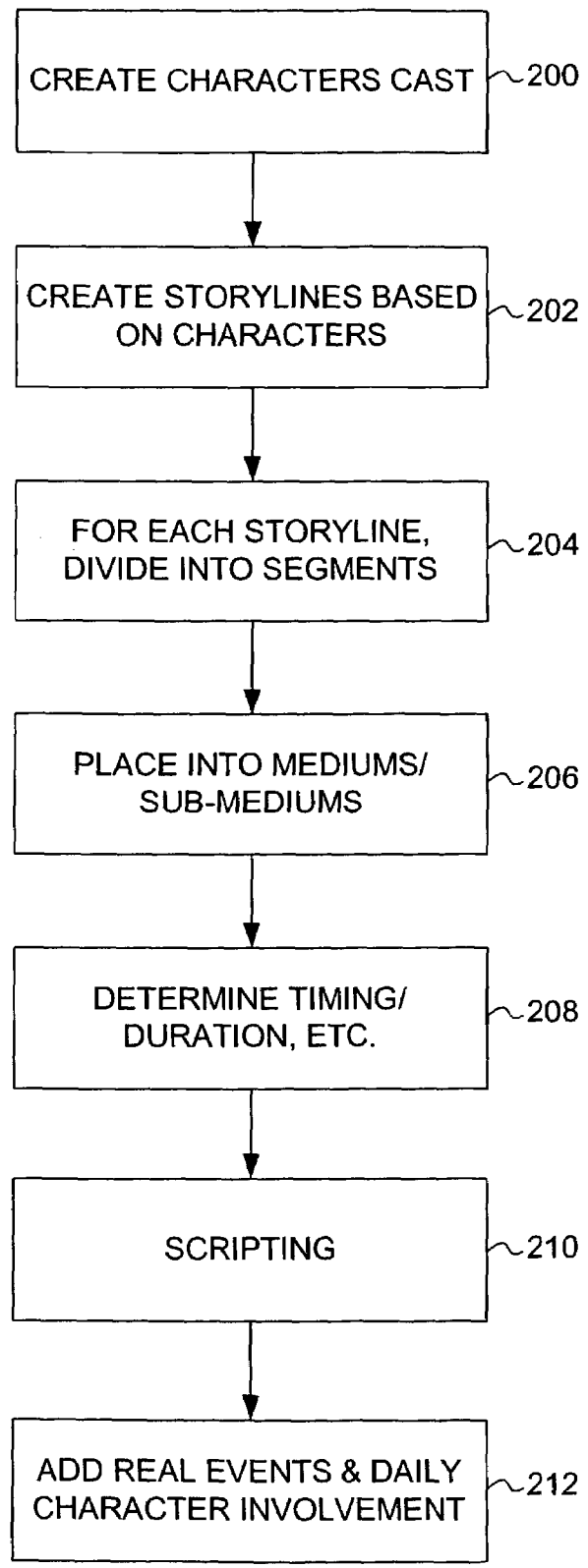
FIG. 2A is a flow diagram of steps for selecting mediums to communicate entertainment-related media content information in accordance with an embodiment of the present invention.

FIG. 2A is an exemplary method for integrating a storyline among different mediums. In step 200, a cast of characters are created to participate in different storylines associated with an integrated entertainment experience. Particularly, each character can be defined according certain attributes, skills and hardships, persona, demographic profile, etc., which are chosen to be interesting at least to a significant audience within one or more target demographic groups. It is also possible to include non-fiction characters, which are non-actors consisting of celebrities known for certain attributes, skills, etc., and other individuals who are not necessarily known to the general public.

In step 202, a plurality of storylines are created, based upon the attributes, skills, persona, etc. of different characters defined in step 200. A storyline is a plot relating to a situation that advances in different segments. In many circumstances, a combination of characters are to be involved in a storyline, although it is possible that a storyline will involve only a single character. The combination of storylines that are to be simultaneously (and in an overlapping fashion) present to consumers through an integrated entertainment experience can be considered a "show."

For each storyline, in step 204 the development of the plot is divided into segments. There is no fixed number of segments, rather, the breadth, scope, and number of segments that are required to present the storyline are dependent upon several factors, including the complexity of the plot and the likely level of interest by an audience (perhaps accounting for specific demographic groups). As will be discussed in further detail below, the relative interest by commercial sponsorship is also a highly relevant factor.

In step 206, each segment is associated with one or more mediums by which to provide an event or otherwise present the "story" to consumers. In many circumstances, the format by which the event or story will be provided through a particular medium is the most relevant factor in pairing a segment with a medium. For example, if content for a segment concerns a character who is participating in a game show on a radio station, the "web radio" medium will likely be utilized. In other circumstances, inter-relationship between particular mediums is a relevant factor. For example, if the segment concerns a town in which the football stadium is burned down, news of this event may be covered in all major news sources, such as television, web radio, e-newspapers, etc., each in a different format. As in step 204, the type of medium(s) selected may also depend in part upon interests of commercial sponsorship.

Once mediums are selected, in step 208 the events that provide the story for the segments are defined. Depending upon the medium, other factors are determined, such as when the event will be provided on the medium and for how long.

Although scripting may have been performed during any of steps 200-208, the events are now scripted for programming (where appropriate).

Once all of the mediums are determined for the plurality of storylines that are to be provided during a common time period, it may be necessary to add real events and surroundings to particular mediums to increase the realistic nature of the experience. For example, real news stories can be added in newspapers (both national and local news), real music can be added to web-radio, etc. Further, since characters in a story are typically in school or are employed, content of this nature is programmed in mediums as well to improve upon the realistic nature of the show. For example, if a character is a high school student who is a DJ on the school radio station, a web radio station may be included that is programmed with the character performing as a DJ for several hours a week.

As described above, certain mediums are characterized by having a plurality of sub-mediums, such as different e-mail addresses for different characters, different web radio stations for different genres of music, etc. Step 206 includes determining whether to program media content into one or more particular sub-mediums.

FIG. 2B illustrates a representation of the process by which mediums are selected in step 206 of FIG. 2A. FIG. 2B is a chart that represents a particular storyline, involving one or more characters, and series of segments (Seg 1-Seg 4) of which the storyline is comprised. In this exemplary chart, there are four mediums which may be programmed to include an event, description or depiction of a segment (web radio, TV, e-newspaper, and e-mail). The medium e-mail is comprised of 4 sub-mediums, A-D.

For each segment, an "X" marker indicates whether a medium will be programmed to include an event, description or depiction of a segment. The numbering in subscript ($X_1$, $X_2$) indicates the order in which the content should be provided to a consumer. When two markers have the same subscript ($X_1$, $X_1$), they are to occur nearly simultaneously.

FIG. 2C illustrates steps for determining whether scripting a referral (implicit or explicit) is necessary during step 210 of FIG. 2A. Particularly, as described above with reference to FIGS. 1A and 1B, for certain mediums, it may be necessary to provide a referral to consumers from one medium to another such that the consumer becomes aware that a certain medium is or will be programmed to provide media content relating to the next segment or another aspect of the segment in the storyline. For example, with regard to FIG. 1A, if a character is to become an in-studio guest on a campus radio station, the URL for receiving streaming media from that web-based radio station should be provided to consumers during a prior segment so that consumers will be able to listen at the appropriate time. However, this referral address might not be required for the implementation according to FIG. 1B, if the web-based radio station is within the portal having centralized access.

In step 214, the process of scripting program content within mediums is commenced. Scripting may be performed in linear order, segment by segment, as indicated in step 216. In step 218, a script is created (if appropriate) for a medium that had been selected for the segment. Based upon the type of selected medium and the actual storyline in the segment, it can then be determined in step 220 whether a referral script is necessary. If so, a script in a medium for a prior segment is modified to include a referral. Finally, in steps 224 and 226, the process of scripting program content for each segment is completed.

A type of event that can be included as a segment is a "live event" that occurs through a reality placement 116. For this event, the character who is involved in the subplot actually appears at a real public forum (such as a sporting event) to add a further sense of realism to the entertainment experience. A difficulty with including such "live events" is that these must be coordinated with the production and airing of the television program, as demonstrated in FIG. 2D.

Figure 2D:
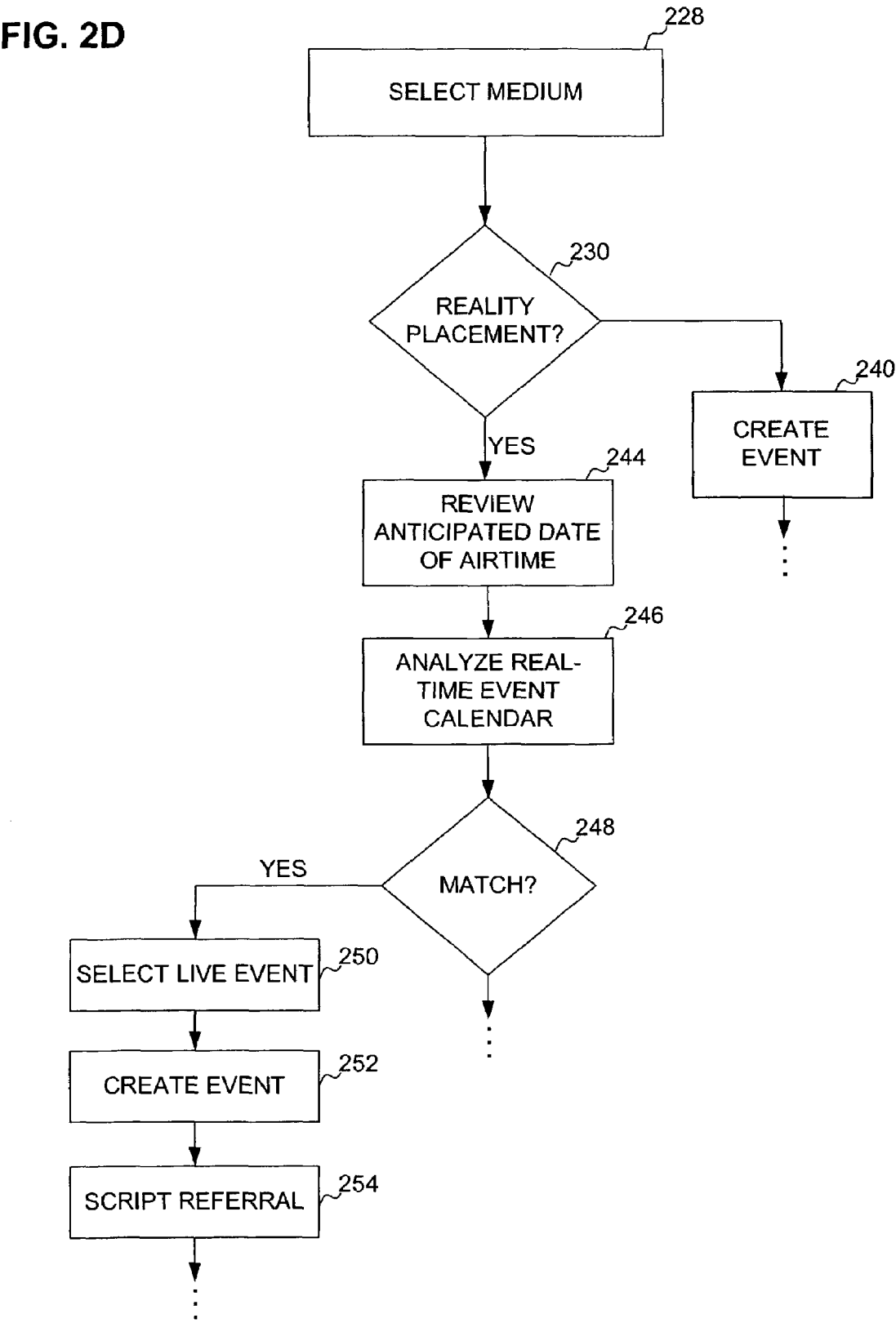
FIG. 2D is a flow diagram of steps for selecting entertainment-related information to communicate as a live event in accordance with an embodiment of the present invention.

FIG. 2D is a flow diagram of steps for selecting media content to provide during the course of a live event, in accordance with an embodiment of the present invention. In step 228, once a medium is to be selected that could be associated with a live event, a check is then performed in step 230 for whether the additional medium is to be a "reality placement." If so, the anticipated date of airtime is reviewed in step 244, along with a real-time event calendar in step 246. These steps must be performed because in order to integrate the reality placement medium with the television program, the reality placement must occur during the week that the segment occurs. If it is determined that there is a match in step 248, then the live event is selected in step 250, and the event is scheduled and the script for the subplot is edited to include a referral to the specific event.

As an example, consider a segment within a storyline in which a character from a small town wins a prize to travel to New York City. To add reality to the entertainment experience, the character appears on television in the stands at a baseball game in New York. To create this "event," it is necessary to determine in advance that the baseball game will occur during the week that the character's redemption of the prize is aired, baseball game tickets must be purchased, and an arrangement must be made with the broadcaster of the baseball game to focus on the character in the stands during the game.

To provide another aspect of reality to the entertainment experience, non-actors and celebrity appearances can also be included within the storyline and occur in any of the mediums to provide further believability that the storyline is a reality.

Implementation Plans and Plot Charting

The creation of a storyline that is to be presented across a plurality of delivery mediums in a synchronized and integrated format can be rather complex, since each delivery medium almost continually is being re-programmed and updated to provide different aspects of the storyline to thereby simulate reality. To organize the creation and scripting of the storyline across these mediums, the methods for creating integrated media programming as described in FIGS. 2A-2D can be performed by creating charts and plans that describe and list prospective subject matter content. As an exemplary implementation of these charts, this information can be organized according to (i) "zones" or categories within the storyline, (ii) particular delivery medium, (iii) yearly overview (iv) monthly overview, (v) weekly overview, and (vi) daily overview, as described with reference to FIGS. 3A-31 below.

FIGS. 3A and 3B are templates of a chart listing different "zones" in a storyline, in accordance with an embodiment of the present invention, with exemplary entries provided therein. As a storyline is created, the creators consider different "zones" within the story that may appeal to different subsets of audiences. As an example, if a situational comedy is being created as an integrated entertainment experience, it is possible that different places that are relevant to a character's life, such as school, home, and work, could be considered as different zones. The template in FIG. 3A provides, for a given zone, a description of the zone and general purpose associated with the zone, and a series of implementation methods and examples. As can be seen, the template in FIG. 3A identifies a particular zone —SCHOOL, and in the "Implementation Methods and Examples" section, descriptions can be provided for different aspects of the "zone," for which different mediums can be created to provide an integrated entertainment experience. For example, if the character in the program is attending high school, a "high school website" can be designed as a medium by which different events can occur between television episodes.

The template in FIG. 3B provides, for another example of a zone —GOVERNMENT, and in the "Implementation Methods and Examples" section, descriptions are provided for the "Mayor's Office," the "Town Manager," the "Chamber of Commerce," the "Town Council," etc. The "zones" for a particular show might include "SCHOOL," "GOVERNMENT," "ENTERTAINMENT," "NEWS," "COMMERCE/SHOPPING," "COMMUNITY," and "SERVICES." In the portal embodiment described with reference to FIG. 1B, these zones can be specifically provided within the portal, and can then lead to mediums by which consumers can access content pertaining to the "zone."

In a preferred embodiment in which consumers enter a portal as a single entry point to various mediums to access media content, the portal is comprised of a plurality of zones, which set forth particular categories of the experience. For example, when characters are created, it is determined how they might or might not be associated with particular zones, and storylines are created while considering how it relates to a zone in the overall storyline. Further, as described in further detail below, different sponsorships can be affiliated with particular zones.

FIGS. 3C and 3D each provide a template of charts for different mediums employed to deliver content for the storyline. The template provides, for a given medium, a description of the medium and the general purpose associated with the medium, and a series of implementation methods and examples. As can be seen, the template in FIG. 3C identifies a particular medium category—RADIO, and in the "Implementation Methods and Examples" section, four different genres of radio stations are provided: High School Station, College Radio Station, Religious Radio Station, and Adult Contemporary Station. These stations will be available for consumers to actually experience to access content via web radio. During the process of creating the storyline, a description is provided for each of these types of stations and how they are anticipated to be used in the context of the storyline.

As an example, if the storyline includes characters who are in high school, a "High School Station" can be provided to deliver news and information from a high school student's perspective, delivered by "high school-aged DJ's." The station can also include advertisements and sponsorship from real corporate sponsors, as will be explained in further detail below with reference to FIG. 4. The audience will be able to "tune in" to the station throughout the week, perhaps between television episodes, to continue enjoying the storyline from this perspective.

FIG. 3D is a chart for the "E-MAIL" delivery medium. A chart such as those shown in FIGS. 3C and 3D can be created for each conceivable delivery medium (e.g., websites, newspapers, e-mail, post mail, etc.) to plan and organize how events and subplots will be delivered to the audience in different formats.

FIG. 3E is a template of a chart of a twelve month story development and implementation plan, in accordance with an embodiment of the present invention, with exemplary entries provided therein. The template provides, for each month, a brief summary of the most significant developments of the storyline. This template organizes the timing and flow of the story, so that at a glance, the creators can organize developments to be continually interesting, realistic, and not overwhelming to the intended audience. As can be seen in the example provided in FIG. 3E is an overview of a storyline about the development of a small town, which will be described in greater detail below.

FIG. 3F is a template of a chart of a three month story development and implementation plan, in accordance with an embodiment of the present invention, with exemplary entries provided therein. The template provides, for each of three months, a brief summary of the most significant developments of the storyline. As with the template in FIG. 3E but with greater detail, this template organizes the timing and flow of the story to organize developments. FIG. 3F is also an overview of a storyline about the development of a character within a small town.

FIGS. 3G and 3H are examples of a template of a chart of a weekly story development and implementation plan, in accordance with an embodiment of the present invention, with exemplary entries provided therein. The implementation of this template are directed to creating an integrated entertainment experience, in that the templates specify what aspects of the storyline (or segment) will be presented for each of the plurality of mediums that are available to the audience. Depending upon the storyline, weekly implementation plans may be created for a plot associated with a particular character or event. As can be seen in FIG. 3F, the template is directed to plot and events associated with a character named "Bean," about which a certain news story is presented on Thursday and Tuesday, and a television program provides storyline about the character on Thursday to air the following week.

Finally, FIG. 3I is an example of a One Day Story Development and Implementation Plan. As can be seen, for each half-hour, the story is provided and delivery mediums are identified (e.g., radio update) to plan the scheduling of content.

The templates of implementation plans provided in FIGS. 3A-3H are specific to a particular storyline developed for an integrated entertainment experience, but will also vary in format and substance according to the plot, characters, theme, type of events, and mediums that are selected for presentation to an audience. Even within a particular storyline, the format of the implementation plans may vary at different times within the development of the story. For example, in a dramatic series, there may be several consecutive episodes where one particular character lives through a major event or crisis. During that time, comparably more events will be planned to provide related content for different mediums concerning that aspect of the storyline. Accordingly implementation plans may be created specifically for that character or situation, whereas that might not be done during other times throughout the dramatic series.

Integrated Marketing and Advertising

As described above, with rising production costs it has become increasingly challenging for networks to receive sufficient revenue from corporate sponsorship to cover the costs of the show and ensure profitability. Creating an integrated entertainment experience that utilizes a plurality of mediums can be significantly more expensive than conventional television programming, since programming is required for several mediums in addition to television, such as websites, web radio, organizing live appearances, etc. To provide an enriching integrated experience, not only must scripts be prepared for a television series, but content must be continually updated and coordinated for other mediums.

Although the costs of production for providing an integrated entertainment experience may be exceed that for conventional television programs, each different medium that is programmed to provide related media content provides additional avenues for generating revenue, either through corporate sponsorship or direct marketing. In addition to, or instead of, the traditional 30-second television commercial break, sponsors can place advertisements on websites that are associated with the show, or incorporate advertising on web radio mediums, e-newspapers, etc. Instead of reaching a consumer once a week during a commercial break in an episode of a television program, a corporate sponsor can provide advertisements and marketing information throughout the week as content relating to an aspect of the storyline is provided for different mediums.

In conventional television advertising, corporate sponsors generally select to advertise during commercial breaks of television programs that are popular with a certain demographic group that the sponsor seeks to reach. As an example, it would not necessarily be cost-effective for a company that markets mountain bikes to advertise during a television program that is generally recognized as appealing only to senior citizens. However, even if a corporate sponsor selects to advertise during a program that is popular with a desired demographics group, it is not possible to schedule advertising during a particular time period that the storyline in the television program relates to or concerns the products that the sponsor seeks to advertise. Continuing with the same example, if a "zone" or aspect of a television storyline concerned a character who took a mountain biking trip, it would not be possible, or at least practical, to select a particular commercial break in the television program that is closest in time to the mountain biking activity on the program.

By creating an integrated entertainment experience across a plurality of mediums, however, particular subplots or events can be provided in particular mediums to enable consumers who are interested in that aspect of the storyline to continue seeking related entertainment media. If the subject matter of the subplot or event is of interest to an existing or prospective corporate sponsor, that sponsor can provide advertising directly on that medium or otherwise within the storyline itself, at the time when the corresponding subject matter will be provided to the audience. In this manner, the corporate sponsor maximizes the benefit of the advertising, since it is most likely to be viewed by those interested in the subject matter.

Continuing further with the example provided above, in a system for providing an integrated entertainment experience, consumers who watched a television program that included a segment of the storyline about mountain biking may be referred (expressly or indirectly) to the character's "mountain biking website," where the character uploaded home videos from the trip. This website could include an advertisement from the mountain biking manufacturing company as a sponsor, thereby providing a captive audience with an obvious interest in the subject matter. In the meantime, audience members who are interested in the subject matter will want to access this website to continue following along with a different aspect of the storyline to further enrich the entertainment experience of the show.

In conventional television advertising, television shows are first created, and corporate sponsors then choose whether to advertise on the show. Although this model can continue to be successfully utilized when advertising on one or more mediums in an integrated media programming format, it is also possible to first receive advertising commitments and then tailor different aspects of the storyline to incorporate subject matter relating to the advertising. Continuing once again with the above-provided example, upon executing an advertising contract for a mountain biking manufacturer, the storyline can be edited to incorporate a "zone" or subplot relating to mountain biking. A medium can then provide mountain biking-related content as a separate event, and the mountain biking company can advertise on this medium.

In another embodiment, instead of providing traditional advertising through a medium, corporate sponsors can become characters within the storyline to improve brand identity, recognition and loyalty. For example, the Chairman of Ford Motor Company can become an occasional celebrity guest within the storyline, where he will interact with characters in the storyline. The process of "putting a face" on the company and further, including the company within the context of the show, can be an effective form of marketing for the company and thus provide profitable sponsorship revenue for the producer of the integrated entertainment experience. To further permeate the character affiliated with the sponsor into the consumer's experience, media content that includes the sponsor can be programmed within multiple mediums.

As another embodiment for securing additional corporate sponsorship revenue utilizing programming in an integrated media format, storylines can be created such that a company's products or services are marketed for sale directly to the audience over different peripheral mediums. By incorporating the product or service as part of the storyline, the show lends credibility, brand recognition, and entertainment value to the product or service, thereby increasing interest by the audience.

Slightly altering the example provided above, when the character from the television program returns from his mountain biking trip, he then decides to take a job at a bicycle shop. One of his tasks is to create a website for the bicycle shop. Quite naturally, an actual website then can be created at the URL specified by the character, and the content of the website can be synchronized with that provided on the television program. In this manner, audience members can directly participate in the integrated entertainment experience by purchasing items directly from the website, thereby providing a retail outlet for the program sponsor.

Figure 4:
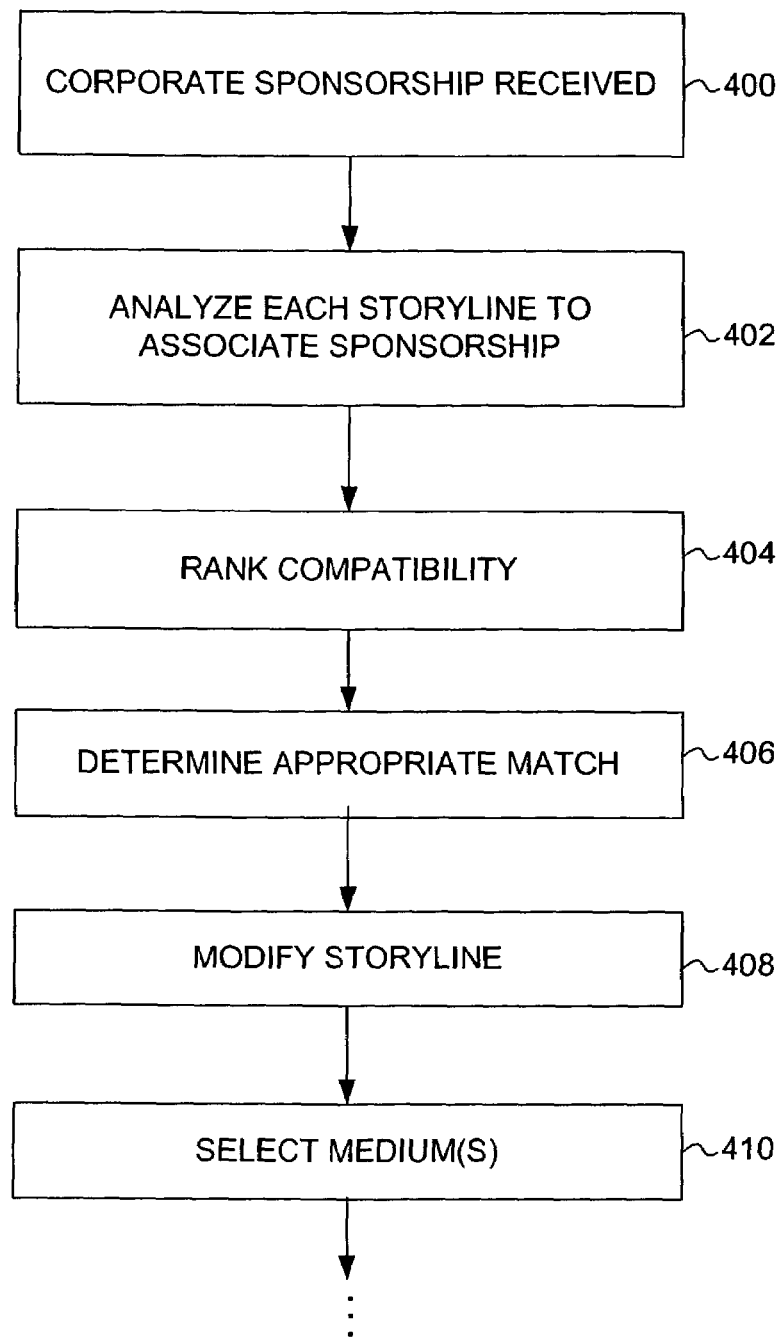
FIG. 4 is a flow diagram of steps for inserting sponsorship content directly into a medium in accordance with an embodiment of the present invention.

FIG. 4 is a flow diagram of exemplary steps for inserting sponsorship into a storyline in accordance with an embodiment of the present invention. In step 400, an account for corporate sponsorship is received during the course of an ongoing program series. Each storyline and associated character(s) is then analyzed in step 402 to determine whether to associate the corporate sponsor with that subplot. In step 404, each storyline and/or character(s) is associated with a compatibility ranking, which can be a subjective determination based essentially upon how realistic it would be to modify or develop the storyline to incorporate the corporate sponsor's marketing or retail activity. Once an appropriate match is made in step 406, a new storyline is created in step 408 to incorporate the corporate sponsor. A medium is then selected in step 410 for providing the sponsorship information in context with the new storyline. If the sponsor seeks to retail goods and services within the show directly (e.g., store selling mountain bike parts), a retailing web site is created within the context of the new storyline, and a referral may be scripted for a television episode to bring the audience to the website. If the sponsor seeks to place an advertisement, then an event is created in a medium and an advertisement is inserted into the event. Finally, if the sponsor seeks to become a character on the show, then the storylines are modified to include new content programming.

Example of a Series for Providing an Integrated Entertainment Experience a. Overview Boonsburg™ is a fictional small town of about 5,000 residents located in the rural back hills of northwestern New Jersey. The former "Egg Basket of Sussex County," Boonsburg is one of the last places in America to still hold fishing contests, bake sales, county fairs, etc. And like many small towns, Boonsburg is stuck in the past.

Upon entering the new millennium, Boonsburg's Mayor realizes that over the next 100 years the most endangered species in America is not an animal or plant, but small town America and its simpler way of life, which in Boonsburg's case is threatened by many things—technological advances, business changes, ever-shortening generation gaps—but most specifically, by two massive "mega chain" type stores that just opened within the county. Like a modern David and Goliath tale, the Mayor decides not to give up without a fight. She urges each and every resident, young and old, to pitch in to help take their beloved little burg into the 21St century by setting up and running their own town website: "Boonsburg.com."

The site will feature everything the town has to offer: shopping, movies, plays, newspapers, night club entertainment, banking, garage sales, car dealerships, fund raisers, insurance, stocks, night school, concerts, Town Council meetings, pharmacies, book stores, college classes, radio, auctions, public access cable, parades, electronics, computers, etc. As the Mayor sees it, this is a "do or die" situation. If the people won't come to Boonsburg, then we'll bring Boonsburg to the people.

b. "Boonsburg.com"—The Television Show

While speaking to Boonsburg College students enrolled in teacher Rich Halke's writing class, Carmen Finestra, Co-Creator and Executive Producer of television's "Home Improvement," is asked if he thought he could write a hit TV show about a hokey little town just like Boonsburg that goes online. Carmen laughs and says he wouldn't have to write it, because it's already happening. Since the reality of this little town taking on the world is already hilarious, a regular "Green Acres meets Microsoft," all he'd do is round up the college's film students and have them start capturing documentary footage of everyone in town doing their part. Carmen declares, "It's already got that life or death struggle built right in, and since no one really knows if your efforts will save the town or not, it's even better than 'Survivor.' Film that and I'd personally take it to the network."

Thus, "Boonsburg.com" becomes a half hour comedy about the trials and tribulations of a group of small town Americans who make a stand by taking their tiny town online to save it, then suddenly find themselves thrown into the center of a hurricane—one they are ill prepared to handle. They inadvertently become the poster children of the new high-tech revolution—and let's just say they "ain't" exactly what Bill Gates had in mind!

The TV show has the look of a living documentary—with a raw footage feel, between "Cops" and MTV's "Real World"—chronicling their daily struggles. It's presented in a never ending stream of interconnected stories and events, all according to the calendar of what really happens at that time of year in every small town in America. Viewers will swear Boonsburg is a real place and that these events are actually happening at that moment. It's the first show of its kind to literally mirror the lives of Americans in small towns and hold them up as heroes for the good they do in their communities.

Since the characters' lives don't stop at the end of an episode, the show, primarily through its online community, utilizes all forms of storytelling—television, streamed internet audio and video, newspapers, webcams, commerce, e-mail, etc.—to continue the lives of the characters beyond the traditional borders presented by the television screen. This gives viewers the chance to step inside a character's "reality," to feel like an actual member of the Boonsburg community, and at times they may even be able to interact with the characters as real people.

"Boonsburg.com" is the first television experience that is "programmed" 24 hours a day, 7 days a week, 365 days a year. Wherever the characters' interests take them, viewers can follow. If a character loves to sing karaoke every Thursday night at a local club, then come Thursday, viewers will have the ability to watch that character sing—badly of course—during that club's regularly scheduled Thursday night webcast. In the next television episode when that character is heard bragging about how great he did, viewers will know the truth because they were there.

However, unlike other television shows which present the "TV show" as the end product, the "Boonsburg.com" TV show is actually the supporting material for the greater Boonsburg.com experience, online community and all. Like shows done in the early days of television ("Colgate Comedy Hour," "Texaco Star Theater"), the "Boonsburg.com" TV show acts as an entertaining weekly advertisement leading viewers directly back to its "sponsor," which in this case is the town's website: "Boonsburg.com." The show's stories and the website's stories are in perfect sync—one leads to the other and then back again.

c. The "Boonsburg.com" Online Community

The "Boonsburg.com" TV show is the portal that gives viewers a 30 minute weekly peek into the larger Boonsburg.com experience. Simply put, it is the catalyst which drives viewers to take part in the entertaining online community and check up on the "real lives" of the people they are watching on the show. For example, when viewers visit the Boonsburg.com website they can choose to hear the local news for that day by selecting one of the town's radio stations to listen to while they surf—supplying music, town news and advertisements just like a real station anywhere.

However, unlike other stations, viewers are actually listening to programming the characters have access too and are a part of. This is unique because by having access to the characters' media and experiencing things as they do, if what a viewer hears, reads or sees changes them, it changes the characters too. If viewers would like to surf other websites outside the Boonsburg.com community they'll have the option to continue listening to their Boonsburg.com radio station simply by taking it with them—thereby allowing viewers to continually "live" within the Boonsburg.com world no matter where they access it from—home, school, or work.

Considering that news changes throughout the day in real towns, each time a viewer checks in with one of the Boonsburg.com radio stations, something new will be happening. For example, a station might report that a pizza delivery vehicle has just been stolen. Later, it might report that the stolen pizza delivery vehicle has been involved in an accident and is now sticking into the side of someone's house, trapping the driver. Later, through "on the scene" reports, listeners may hear that the Fire Department is using the "Jaws of Life" to extricate the driver . . . who just so happens to be a bear. A eye witness, Andy Unanue of Goya Foods, who was on his way to speak on the town's Lecture Series, might be interviewed saying, "It was heading straight for me when suddenly the bear swerved and ended up driving into that lady's living room." The next day, Andy Unanue of Goya Foods is pictured on the front page of "The Boonsburg Post" under the headline "Bear Saves Man's Life."

The driving bear story may dominate all of the town's media for several days and carry over from radio, to cable, to newspapers, to chat, and end up being covered in the next episode of "Boonsburg.com" on TV. Once that story has petered out of the town's media system and been forgotten, weeks later it can creep back in simply by having "The Boonsburg Post" carry a photo of the Chief of the Fire Department holding a ten thousand dollar check made out to the New Jersey State Burn Center, compliments of Goya Foods. It seems Andy was so impressed with the skill and dedication of the volunteers, he wanted to give something back to the firefighters. He also sent along a five hundred dollar check to help take care of his new buddy, the driving bear—which, it just so happens, the Grammar School kids have been holding a "Name the Bear" online competition.

As happens in real life, multiple forms of media cover specific events in their own respective manners. Realizing that there are other ways to tell stories besides TV, the Boonsburg.com experience—through its online community—syncs up those other ways with its half hour TV show to deliver stories that take entertainment, and this new medium, to new heights.

d. The Personal Touch

The magic of the Boonsburg.com experience is that through utilizing and syncing up all available forms of storytelling to act as one larger unit, the viewers are kept up to date on all happenings in and around Boonsburg—a community they get to interact with and which they believe is actually alive. As more choices become available to supply story telling information, such as the high school students starting their own underground Internet radio station, or the local churches banding together to offer Internet radio listeners a more spiritually appealing station, the more personal the experience becomes to viewers by allowing them to hear, see, and learn about things from people in the community who are like them—and in many cases, represent their personal convictions.

An entire family might sit down each week to watch the TV show together, but because they accessed the online community as individuals, no two members will have the same experience. For example, since each listened to radio stations that represented their personal tastes in music, the news they heard was not reported in the exact same way as a station for those with different tastes. What the high school station may have reported as a victory for the young people of the town, the easy listening station may have reported as a defeat, and the religious station may not have reported at all finding nothing about the story to be newsworthy.

The entertainment that family watched via club cams may have ranged from the coffeehouse's "Open Mike Poetry Night" to another club's "Bluegrass Thursday" or even a "live" performance of the town's barbershop quartet. Their choices of local public access shows broadcast via Boonsburg Cable might have been just as eclectic, so that by the next time the entire family joins to watch the following week's episode, different members will personally connect with different things featured in that episode all because of what they experienced on their own particular journey. Even though the show represents multiple age groups, each age group will swear that this show is about them.

e. Welcome Neighbor!

Move into "Boonsburg.com" and you'll get an e-mail address—which, by the way, will correspond with a real characters house in town—JDoe8OakSt@Boonsburg.com. Upon becoming a virtual resident, you receive a welcome basket from the town—filled with coupons—and occasional town announcements. You also receive e-mailed home delivery of "The Boonsburg Post"—your paper girl is a character on the show, so don't forget to tip. The paper offers coverage of local news events: fires, elections, floods, local color with pictures, parades, plays, upcoming events—everything that happens in any small town paper happens in Boonsburg's. Like any real paper there are advertisements and coupons—just print them out and take them to the store, or click them to shop online.

During an episode you might see a character driving down a street and turn into your house's driveway—and you realize your address is actually their address. One day you see your house on the front page of "The Boonsburg Post" covered in toilet paper—"Halloween Vandals Strike Again." The police department e-mails you and all the virtual tenants who share that same e-mail address not to worry, since they're on the case.

Another time you find your house pictured in the paper as the second place winner in the "Best Holiday Decorations" competition, though you believe that the owner who did all the work really should have placed first. A few months later during a webcamed Town Council meeting, residents complain because—as a form of protest—the owner of your house refuses to take down his lights. "The Boonsburg Post" covers this saga as it unfolds throughout the year, splitting the town between those in favor of your lights and those against. The owner may even install his own webcam online so that he can show the house's lights to the world for the entire year. Come December, as the town makes its way toward the house to re-judge the year old decorations, the owner blows a fuse.

As that week's episode ends, you see the Fire Department rush off to put out a fire—as they pull up to the structure you realize it's your house! In the next day's "The Boonsburg Post" you read that it was just minor smoke damage—seems without electricity the owner put a candle in the window and it torched the drapes. All the residents who share that e-mail address receive an e-mail from the Fire Chief commending your virtual landlord on his bravery for trying to contain the fire before they arrived, but letting you and he know it's not wise to endanger your own safety. The Chief then outlines proper fire procedure people should follow in the future. Everyone at your virtual address receives e-mails from neighbors offering help, as well as the town's insurance company trying to sell you on their services. Welcome to the neighborhood!

f. "And Now, a Word from Our Sponsors . . . "

Each year on January $1^{st}$ residents of Boonsburg receive an e-mail reminding them to change the batteries in their smoke detectors—sponsored by a battery company and with coupons attached. You'll begin to notice there are no banner ads within "Boonsburg.com." Instead, every ad is placed within the story context of the environment—what we refer to as "contextvertising."

For instance, if there is an ad for "Guess Jeans" in the high school's online paper, "The Mutant," it's not just a carelessly placed banner saying 'BUY GUESS JEANS.' Instead, the ad is carefully woven into the reality of the larger community, and mentions not only the product, but also the store in town carrying the product being advertised. More than likely the owner of the store is a character you know from the show. So ads like "Molly's Fashions on Main—Featuring 10% Off Guess Jeans" will be the norm, not the exception.

g. Meet the Neighbors

Viewers can also enjoy the array of personal, colorful websites maintained by town residents. These range from Earl's "Aliens and Conspiracy" page to the "Boonsburg Cards and Gifts" site where Dotty continuously offers free online e-cards of her dressed in crazy outfits and singing—perfect for all occasions, or not. Dotty also maintains the town's Dating Service page, because, as she says of herself: "I need a man." Now her questions are a bit crazy, and her "5 Wigs Up" matches turn out to be duds, but it's a hoot to join just to see who she fixes you up with. Plus, if you do e-mail your "match," it's easy to break the ice by saying "Dotty said we should talk . . . ."

h. Boonsburg Live

Viewers have the chance to watch live events happening in the Boonsburg area: concerts, plays, talent shows, County Teen Arts Festival, parades, The County Fair, sporting events, softball games between local bars, Queen of the Fair Pageant, etc. These events give viewers the chance to feel like a member of the community and experience small town life from the inside.

Viewers can also check in on the town via multiple live webcams which have been set up by the Town Council to show the world what the town looks like. You'll see cars driving by, people walking down streets—occasionally a character might walk by. Others might include the town's weather cam, Steamer restoration cam, Earl's "Aliens in the Sky" cam, the intersection of Main Street and Clara Road (which just happens to capture the town's one and only car chase involving a stolen Budweiser truck parked on Jeremy Lane, giving Budweiser significant exposure). These static webcams are not focused on individuals, but instead are focused on specific town elements to establish the town in your mind as a constant, believable place where real people live.

Another live activity viewers can enjoy are the lectures given by various authors, carried live from the town's bookstore. One week you may see Kurt Vonnegut online, next week might be a local writer, followed then by Toni Morrison.

i. "See Me, Hear Me . . . "

Viewers can also listen in on Town Council meetings, as well as other special interest groups in the town like the Historical Society, PTA, Chamber of Commerce, Theater Company, etc. By witnessing the inner workings of Boonsburg in action, it reinforces the viewer's belief that Boonsburg is a real town and that the characters actually exist.

Viewers might also become fans of the town's local access cable shows made by local students. Programs star local talent like the dwarf gym teacher, overweight slob of a chef, tough female woodshop teacher, and are done by the students themselves. Or you might be interested in seeing how the high school, in an effort to contribute programming to the site, carries its morning video announcements online.

j. The Out-of-Towners

To help with the town's efforts, the college invites barons of industry to speak to the residents as part of its weekly lecture series, which is also carried on the web, giving them insights regarding how to succeed in business. Tom Mendiburu, the county's premiere entrepreneur who is also supporting the town's online efforts, kicks things off. Another week viewers may hear the President of M&M Mars, which is located in the next county. The following week it might be Andy Unanue, COO of Goya Foods, who just so happens shows up late to the lecture because of a certain run in with a certain driving bear.

The lecture series gives businesses a chance to step in and actually support the town's efforts, thereby putting a face on a faceless corporation. It also gives them wonderful press, seeing how they are there to help out the little guy. Plus, each visiting lecturer offers to help the Mayor, all she has to do is call—and you can bet in the following weeks she will! While in the market, she might call Andy Unanue of Goya and ask which bean would go best with her chili, or she might call and pull Bill Ford, CEO of Ford, out of an important meeting so that he can explain Ford's new lease package to her friend Eloise. At first the executives grit their teeth, but it becomes a running gag how they drop whatever they're doing just to explain the simplest task to Boonsburg's Mayor.

k. Neighborhood Watch

Keeping a protective watch over all in the community is a key part of the Boonsburg.com experience. Whenever viewers visit the site they'll see a photo from the National Missing and Exploited Children Network in the corner of the homepage, asking "Have You Seen Me?," because community is worldwide in Boonsburg. The Boonsburg Police Department also has a virtual presence so the town can stay safe for all to enjoy.

Additionally, the town has its own built-in chaperone—since small towns keep it clean, the site reflects that same philosophy. The high school students create a "CyberChaperone" based on their teacher, Freddie, who films a segment each week where he dresses up as a large Cuban woman and gives her "Chaperone's State of the Union" Address. Since she considers herself the "Protector" of the young, the CyberChaperone scolds kids for being "bad"—a very funny piece of weekly online content. She eventually carries over to other areas of the online world—if anyone tries to post dirty content in chat rooms, the CyberChaperone suddenly appears and says "Stop being bad or I will tell your mother or legal guardian." She might even follow up by sending an e-mail to their town address letting them know that "Big Sister is Watching."

l. Bienvenidos a Boonsburg Amigos Nuestros!

Since the town's website is maintained with the help of Boonsburg College (with one of the best language programs on the East Coast), everything will be translated into multiple languages by the college's language majors: Spanish, Japanese, French, German, etc. The online community experience will be able to be enjoyed around the world at the exact same time, achieving what the Boonsburg Town Council set out to do—bringing in new business from around the world!

m. "I Still Don't Know What You'Re Going to do Next Summer"

When the TV season stops in May, the TV show ceases production (since all of the student cameramen and women are on summer break); however, the website continues throughout the summer, remaining alive and fully functional. As in real life it never stops—its characters, like real people, never stop living either. One of the many things viewers will be able to see online over the summer—while other shows are simply airing reruns—will be our very own Miss Boonsburg actually competing in the real "Sussex County Farm and Horse Show's Queen of the Fair Pageant" against contestants from neighboring towns.

When the TV show returns at the end of September, it won't simply pick up right were it left off in May like shows of today do. Instead, it will pick up right at the point were the website is at that exact moment. The show falls right back into perfect sync with the website until next summer, when it repeats the process all over again. In this way the site dictates the TV show, the TV show does not dictate the site.

n. Be Careful What You Wish for "Boonsburg.com" tells the story of a group of regular, small town Americans who set out to save their beloved town. But along the way an interesting thing happens—the town inadvertently ends up having overnight frame thrust upon itself and its residents.

Imagine if all the frame that fell upon the participants of "Survivor" after the show ended had actually occurred during the filming of the show. What if dealing with that type of overnight frame was actually part of the original concept? What would have happened if, during filming, Colby suddenly became the most popular person on the show by the second week—and he knew it as it was happening? How would the others begin to react?

What would happen if, because of his frame, Colby left the show for a day to go off and film a Nike commercial? Would the others be jealous and treat him differently? Would they try to boot him off the show and ruin any chance he might have to gain even greater frame? And, since all of his frame exists because he is "on" the show, what steps would he take to insure that he stays "on" the show, thereby insuring his frame will continue? Now just imagine if "Survivor" took place in a small town—leave the town and lose the frame.

Boonsburg.com is an experience that actually has two separate stories. The first is that of the daily trials and tribulations of a group of small town Americans pitching in to save their community—this is consistent with TV story telling of today. The second, and even larger story, is the one viewed from above and over time. It's the story of how regular people react to frame, what they do with it, how it affects them—and, once they've got it, are they ever willing to give it up? Frame is America's number one export. If Andy Warhol is correct that everyone gets their 15 minutes of frame, to what lengths would people go to turn that 15 minutes of frame into an hour, a day, a month, a year, or a lifetime?

o. The Goal

By starting out with a normal American small town—which, of course, is behind the times and still innocent—and adding complications, such as name brand chain store businesses who see the website and want to come to town, the viewer gets the opportunity to watch prosperity affect the lives of the town's inhabitants. They watch as it helps some but hurts others—like the tiny hardware store which can't handle the competition and disappears, taking its owner, a volunteer fireman, and his entire family out of the community.

By simply upsetting the town's normal balance the residents are forced to try to keep up with a world that's changing faster then they can adjust—a world where volunteers are disappearing faster then they can be replaced, a world that's changing because VIEWERS are causing it to change simply by using Boonsburg.com's services. And, as has been happening across the country, little by little the small town everyone knows and loves begins to give way to big city influences. In the process of seeking prosperity the town of Boonsburg ends up losing what it set out to protect in the first place—its people.

p. Which Came First: the TV Show or the Website?

For those who only view the TV show and never sees the website, they won't feel like—or even know—they're missing out on anything since the TV show is a great half-hour with or without the website. The same goes for the website—even if one never sees the TV show, there's enough entertainment and functionality there to keep a viewer hooked and coming back for more. But if a viewer experiences BOTH of them together, THAT will truly be a whole new level of entertainment.

q. The Never Ending "Boonsburg.com" Integrated Entertainment Experience

Imagine watching your favorite show on television and being able to sign up for the same adult college extension course being taken by your favorite character. On the specified night you attend the weekly simulcast of the class via the web and actually see the character enter the classroom and take a seat. During the lecture she asks questions. In a later episode of the show you hear her groan about a particularly tough homework assignment—the same one you're stuck on. In another episode you notice that she seems to be coming down with a cold, then you find she's absent from the next web class. Concerned, you drop her a "get well soon" e-mail card from "Boonsburg Cards and Gifts"—and she responds happily. When you complete the course, you find your name listed online right next to hers as successful graduates. During a later episode you hear her quote a passage from a book you read in class, and you're the only one in your family who knows where she got it. This type of personal experience is just the tip of the iceberg of what can be—the possibilities are endless.

The foregoing disclosure of embodiments of the present invention and specific examples illustrating the present invention have been presented for purposes of illustration and description. It is not intended to be exhaustive or to limit the invention to the precise forms disclosed. Many variations and modifications to the embodiments described herein will be obvious to one of ordinary skill in the art in light of the above disclosure. The scope of the invention is to be defined only by the claimed appended hereto, and by their equivalents.

What is claimed is:

1. A method for integrating media programming of a storyline among a plurality of mediums, comprising:
   creating a plurality of segments in a storyline;
   for each segment, selecting at least one medium among a plurality of mediums via which media content relating to at least one event of the segment is to be provided, wherein each selected medium represents a different mode for delivery of the media content in a different format;
   programming the selected mediums with media content relating to the events of the segments in the storyline, wherein the selected mediums are programmed with related media content in a manner that enables consumers to experience a continuously evolving storyline, wherein the programming of the selected mediums is synchronized together such that media content that is accessed at the selected mediums at any given time period relates to events that occur within the storyline during that time period, and by synchronizing the programming among the selected mediums, the storyline continually evolves through the selected mediums that provide the related media content in the different formats, and wherein no single medium is programmed with all media content in the storyline; and
   determining whether a referral is necessary for one of the selected mediums, wherein a referral from a certain medium to another medium provides an indication to a consumer that the certain medium is or will be programmed to provide media content relating to a next segment;
   in response to a determination that a referral is necessary for one of the selected mediums, modifying the media content programmed in another one of the selected mediums for a prior segment to include the referral for the one of the selected mediums
   wherein the storyline is integrated among the selected mediums to provide an integrated entertainment experience to consumers.

2. The method of claim 1, wherein the media content programmed in each selected medium from a subset of the selected mediums is available for individual access via a common centralized portal.

3. The method of claim 2, wherein for a selected medium whose programmed media content is not available for access via the common centralized portal, the location of the selected medium is referenced in another segment in the storyline.

4. The method of claim 1, wherein media content programmed in each selected medium is programmed to be available for a duration of time such that the storyline is experienced by accessing any subset of selected mediums in any order.

5. The method of claim 1, wherein the media content programmed in the selected plurality of mediums is programmed to be available during overlapping time periods such that the storyline is experienced by accessing any subset of selected mediums in any order.

6. The method of claim 1, wherein the plurality of mediums are additionally programmed with media content for segments of other storylines in a program series, and wherein the media content programmed in each of the plurality of mediums is synchronized such that segments relating to a same period in each of the storylines can be experienced during the same period.

7. The method of claim 1, wherein the selecting at least one medium for each segment depends on one or more of: a format that the medium provides media content in, an interrelationship between mediums, or interests of commercial sponsorship.

8. The method of claim 1, wherein selecting at least one medium among a plurality of mediums for each segment further comprises:
   determining whether the at least one medium is to be programmed to include media content relating to the at least one event of the segment;
   determining the order in which the media content relating to the events of the segments is to be provided by the selected mediums.

9. A method for integrating media programming of a storyline among a plurality of mediums, comprising:
   creating a cast of characters for performing at least one storyline, wherein the storyline includes a plurality of segments;
   creating a plurality of media content relating to the at least one storyline by incorporating activities by at least one character in the cast of characters;
   for each segment, selecting at least one medium among a plurality of different mediums via which media content relating to at least one activity of the character is to be provided, wherein each different medium represents a different mode for delivery of the media content in a different format;
   programming the selected mediums with the plurality of media content relating to the activities by the at least one character, wherein the selected mediums are programmed with related media content in a manner that enables consumers to experience a continuously evolving storyline, wherein the programming of the selected mediums is synchronized together such that media content that is accessed at the selected mediums at any given time period relates to activities that occur within the storyline during that time period, and by synchronizing the programming among the selected mediums, the storyline continually evolves through the selected mediums that provide the related media content in the different formats, and no single medium is programmed with all media content in the storyline;

determining whether a referral is necessary for one of the selected mediums, wherein a referral from a certain medium to another medium provides an indication to a consumer that the certain medium is or will be programmed to provide media content relating to a next segment;

in response to a determination that a referral is necessary for one of selected mediums, modifying the media content programmed in another one of the selected mediums for a prior segment to include the referral for the one of the selected mediums, and wherein the storyline is integrated among the selected mediums to provide an integrated entertainment experience to consumers.

10. The method of claim 9, wherein a subset of the plurality of mediums are comprised of a plurality of sub-mediums and each sub-medium is programmed with media content relating to a different perspective of the storyline, or different live events.

11. The method of claim 9, wherein the cast of characters includes living and fictional characters.

12. The method of claim 11, wherein at least one character is associated with a product or service from a corporate sponsor, and the plurality of media content relating to the at least one storyline incorporates activities by the at least one character that provide brand identification or product marketing for the corporate sponsor.

13. A method for utilizing media programming for marketing, comprising:

creating a storyline including a plurality of segments, wherein media content associated with aspects of the segments is programmed among a plurality of different mediums, wherein each medium represents a different mode for delivery of the media content in a different format, and wherein no single medium is programmed with all media content in the storyline;

obtaining a sponsorship from a sponsor for a program series, the storyline associated with the program series;

identifying an aspect of the storyline that can be associated with the sponsor;

selecting at least one medium from the plurality of different mediums for providing media content relating to the identified aspect of the storyline and for including at least one of a reference to the sponsor or an offer to purchase a product or service of the sponsor; and adding media content relating to the sponsor within the storyline, wherein said adding comprises modifying the media content programmed in another one of the mediums for a prior segment to include the reference to the sponsor or the offer to purchase the product or service of the sponsor, wherein a reference included in a certain medium provides an indication to a consumer that the certain medium is or will be programmed to provide media content associated with the sponsor.

14. The method of claim 13, wherein the media content provided on the at least one medium includes a retail website, and offers to purchase a product or service of the sponsor are provided through a retail website that is identified in accordance with the identified aspect of the storyline.

15. The method of claim 13, wherein at least one aspect of the storyline is associated with a product or service of the sponsor by determining whether the aspect of the storyline is compatible with the type of goods or services provided by the sponsor.

16. The method of claim 13, wherein at least one aspect of the storyline is associated with a product or service of the sponsor by determining whether the aspect of the storyline appeals to consumers in a demographics group to which the sponsor desires to market goods of services.

17. A system for integrating media programming of a storyline comprising a plurality of entertainment mediums, wherein the storyline includes a plurality of segments, wherein for each segment, at least one medium from among the plurality of entertainment mediums is selected via which media content relating to at least one event of the segment is to be provided, wherein each of the selected mediums represents a different mode for delivery of media content in a different format, and the selected mediums are selectively programmed with media content relating to different events in a common storyline such that the different events in the common storyline that are associated with different formats are provided on mediums of a corresponding format and no single medium is programmed with all media content in the storyline and wherein the programming of the selected mediums is synchronized together such that media content that is accessed at the selected mediums at any given time period relates to events or activities that occur within the storyline during that time period such that the storyline is experienced by accessing any subset of the selected mediums in any order, wherein a determination is made regarding whether a referral is necessary for one of the selected mediums, wherein a referral from a certain medium to another medium provides an indication to a consumer that the certain medium is or will be programmed to provide media content relating to a next segment, and wherein in response to a determination that a referral is necessary for one of the selected mediums, the media content programmed in another one of the selected mediums for a prior segment is modified to include the referral for the one of the selected mediums.

18. The method of claim 1, wherein the at least one event of the segment is a live event and the method further comprises:

selecting a medium via which media content relating to the live event is to be provided;

determining whether the selected medium comprises a reality placement;

in response to a determination that the selected medium comprises a reality placement, analyzing an anticipated date of airtime of the segment and a real-time event calendar to determine if there is a match between the time the segment airs and the live event;

in response to determination that there is match, modifying the media content programmed in another one of the selected mediums for a prior segment to include a referral to the live event, wherein a referral included in a certain medium provides an indication to a consumer that the certain medium is or will be programmed to provide media content associated with the live event.

* * * * *

UNITED STATES PATENT AND TRADEMARK OFFICE
CERTIFICATE OF CORRECTION

PATENT NO. : 7,640,561 B1  Page 1 of 1
APPLICATION NO. : 10/278849
DATED : December 29, 2009
INVENTOR(S) : Richard P. Halke et al.

It is certified that error appears in the above-identified patent and that said Letters Patent is hereby corrected as shown below:

In the specification, please make the following changes:

Column 22, line 5, change "frame" to --fame--;
Column 22, line 6, change "frame" to --fame--;
Column 22, line 9, change "frame" to --fame--;
Column 22, line 14, change "frame" to --fame--;
Column 22, line 18, change "frame" to --fame-- both occurrences;
Column 22, line 20, change "frame" to --fame--;
Column 22, line 22, change "frame" to --fame--;
Column 22, line 29, change "frame" to --fame--;
Column 22, line 30, change "frame" to --fame--;
Column 22, line 32, change "frame" to --fame--; and
Column 22, line 33, change "frame" to --fame--.

Signed and Sealed this

Twenty-third Day of March, 2010

David J. Kappos
*Director of the United States Patent and Trademark Office*